United States Patent
Filo et al.

(10) Patent No.: US 6,215,498 B1
(45) Date of Patent: Apr. 10, 2001

(54) VIRTUAL COMMAND POST

(75) Inventors: Andrew S. Filo, Cupertino; Mark P. Morgenthaler, Los Gatos; Glenn C. Steiner, Los Altos, all of CA (US)

(73) Assignee: Lionhearth Technologies, Inc., CA (US)

( * ) Notice: Subject to any disclaimer, the term of this patent is extended or adjusted under 35 U.S.C. 154(b) by 0 days.

(21) Appl. No.: 09/150,769

(22) Filed: Sep. 10, 1998

(51) Int. Cl.$^7$ .................................................. G06T 15/00

(52) U.S. Cl. ........................... 345/419; 345/473; 345/331

(58) Field of Search ..................................... 345/419, 472, 345/473, 474, 475, 331, 156, 157, 158

(56) References Cited

U.S. PATENT DOCUMENTS

| | | |
|---|---|---|
| 5,319,747 | 6/1994 | Gerrissen et al. . |
| 5,347,306 | 9/1994 | Nitta . |
| 5,379,374 | 1/1995 | Ishizaki et al. . |
| 5,381,158 * | 1/1995 | Takahara et al. .................... 345/156 |
| 5,491,743 | 2/1996 | Shilo et al. . |
| 5,588,104 | 12/1996 | Lanier et al. . |
| 5,604,848 | 2/1997 | Harada et al. . |

(List continued on next page.)

OTHER PUBLICATIONS

"Advanced Animation and Rendering Techniques, Theory and Practice " by Allan Watt and Mark Watt, published by Addison–wesley 1992, ISBN 0–201–54412–1 at pp. 191–199, section 6.3.3 Environment Mapping, 1992.*

"Distributing Virtual Worlds in a Tele–teaching Enviroment " by Klaus Rebensburg, Technical University of Berlin, klaus.rebensburg@prz.tu–berlin.de. pp. 66–75, 1995.*

Indianapolis 500 Manual by Eric Lindstrom and Edited by ZJ. Yee, from the Papyrus Design Group. p. 21, 1989.*

"NPSNET: JANUS–3D Providing Three–Dimensional Displays for a Two–Dimensional Combat Model " by David R. Pratt et al. Graphics and Video Laboratory Naval Postgraduate School, Department of Computer Science, Monterey, CA. pp. 31–37, 1991.*

Primary Examiner—Mark Zimmerman
Assistant Examiner—Envique L Santiago
(74) Attorney, Agent, or Firm—Thomas C. Feix

(57) ABSTRACT

A system of networked terminal apparatus for creating a three dimensional animated work environment wherein terminal users of various levels of immersion are depicted as avatars in the virtual work environment and wherein actions and information of the terminal users is input into the virtual work environment through their corresponding avatars in order to perform complimentary, independent and cooperative tasks in parallel to create simultaneous sets of solutions to problems relating to command, control, communications, cognition and intelligence. In a preferred embodiment, the virtual work environment emulates an actual military command post, with all of the instruments and familiar surroundings emulated in function if not in form. The terminal users of the environment (i.e., the commanders and staff) immerse in this environment via virtual reality displays (audio and video) and inputs (microphone, body encoders and pointing devices) connected to individual personal computers. The avatars are able to interact with one another in the virtual environment and they are able to select and manipulate functional objects displayed in the virtual work environment. Non-immersed terminal users provide raw data streams to the virtual environment. The non-immersed terminal users are displayed as seated avatars or selectable icons. The immersed users, through their avatars, may select the seated avatars or icons to display data streams prepared by the non-immersed terminal users on projection screens displayed in the virtual work environment. The displayed data may be further processed by the immersed terminal users for collaborative decision making by the avatars present in the virtual environment. The processed data may be transmitted outside the virtual work environment as orders or instructions.

29 Claims, 20 Drawing Sheets

U.S. PATENT DOCUMENTS

| | | |
|---|---|---|
| 5,627,977 | 5/1997 | Hickey et al. . |
| 5,627,978 | 5/1997 | Altom et al. . |
| 5,630,042 | 5/1997 | McIntosh et al. . |
| 5,659,691 | 8/1997 | Durward et al. . |
| 5,659,692 | 8/1997 | Poggio et al. . |
| 5,818,420 * | 10/1998 | Mitsumine et al. ............ 345/156 |
| 5,841,887 * | 11/1998 | Kuwayama et al. ............ 382/118 |
| 5,844,824 * | 12/1998 | Newman et al. ............ 364/708.1 |
| 5,850,352 * | 12/1998 | Moezzi et al. ............ 364/514 A |
| 5,956,038 * | 9/1999 | Rekimoto ............ 345/419 |
| 6,005,548 * | 12/1999 | Latypov et al. ............ 345/156 |
| 6,023,278 * | 2/2000 | Margolin ............ 345/419 |
| 6,044,403 * | 3/2000 | Gerszberg et al. ............ 709/225 |
| 6,049,327 * | 4/2000 | Walker et al. ............ 345/156 |
| 6,052,114 * | 4/2000 | Morifuji ............ 345/158 |
| 6,053,737 * | 4/2000 | Babbitt et al. ............ 434/30 |

* cited by examiner

ZOOM LOCK

POINT OF VIEW WHEN ZOOM LOCKED

VIRTUAL COMMAND POST

TECHNICAL FIELD

The present invention is directed to a networked computer based system for creating a virtual work environment wherein participants of various levels of immersion within the virtual work environment are able to perform complimentary, independent and cooperative tasks in parallel to create simultaneous sets of solutions to problems outside the virtual work environment.

BACKGROUND ART

The United States Army has an unfulfilled requirement for Command, Control, Communication, Cognition, and Intelligence ("C4I") that is collaborative, dispersed, interactive, and realtime. Current C4I takes place in command post tents using maps, overlays and networked computers. These tents are fixed sites that require commanders to travel between command posts to ensure that every unit under his command shares his common vision of the battle. There exists a need for a communications system which eliminates the delay caused by this travel.

Furthermore, there are constraints placed on the communications medium that currently supports the above-described interaction. The current generation of secure Digital Military Radios has a limited bandwidth of 14.4 KBS. This constrained communication carries voice and data simultaneously. The Army has tried to overcome this problem by using video phone technology. The problem with transmitting video, especially in network applications, is the large bandwidth required. Current state of the art full frame video phone technology is characterized by generally poor image quality and slow image transmission rates. The limited nature of the technology has proved entirely unsatisfactory to the nature of C4I operations.

Virtual reality video phones and virtual reality conferencing technologies have been utilized in the past to provide simulated or virtual full frame video of participants in a video conference. These technologies allow remote conference participants to present multimedia for joint conference meetings.

U.S. Pat. No. 5,491,743 discloses a virtual conferencing system comprising a plurality of user terminals that are linked together using communication lines. The user terminals each include a display for displaying the virtual conference environment and for displaying animated characters representing each terminal user in attendance at the virtual conference. The user terminals also include a video camera, trained on the user sitting at the terminal, for transmitting video signal input to each of the linked terminal apparatus so that changes in facial expression and head and/or body movements of the user sitting in front of the terminal apparatus are mirrored by their corresponding animated character in the virtual conference environment. Each terminal apparatus further includes audio input/output means to transmit voice data to all user terminals synchronous with the video transmission so that when a particular person moves or speaks, his actions are transmitted simultaneously over the network to all user terminals which then updates the computer model of that particular user animated character on the visual displays for each user terminal. Since only changes in the visual information are sent over the network, the size of the transmitted video signal information is substantially reduced, thereby conserving bandwidth for a more intuitive, realtime feel.

U.S. Pat. No. 5,491,743 also discloses a virtual conferencing system which includes a shared application section for storing programs such as a shared chalkboard, where attendants of the conference are able to type in text and draw pictures. In this type of virtual conferencing system, each conference participant is of equal weight meaning that each participant has an identical level of immersion within the virtual environment. A limitation associated with such an equally weighted system is that it only allows collaboration of a certain type of activity or work to take place. Since each conference participant performs the same function, they must bring pre-prepared information to the virtual environment for interaction with the other participants. The notion here is that the conference participants do not use the virtual environment for extended periods of time because they must first prepare information before entering the virtual environment. The virtual environment is only used to make changes in the prepared information. In order to act on these changes in the real world, the conference participants must physically exit the virtual conference environment so that they can distribute the changes in the information for action by others. Therefore, to make the virtual environment more like a real life work environment, it would be desirable to make the virtual environment the primary place of work such that the conference participants are able to transmit and receive information in real time to and from the outside world so that they can change or process the information in accordance with their own needs.

While the communications and meeting aspects of the prior art virtual video phone technologies and virtual conferencing systems address some of the low level needs of C4I, they fail to create a functional virtual work environment that commanders require. A complete virtual work environment that has all of the tools required for command and staff to carry out the independent and collaborative acts that constitute C4I would constitute a significant advance in the art.

SUMMARY OF THE INVENTION

It is a primary objective of the present invention to provide a computer networked system for creating a virtual work environment wherein participants of various levels of immersion within the virtual work environment are able to perform complimentary, independent and cooperative tasks in parallel to create simultaneous sets of solutions to problems outside the virtual work environment.

To satisfy and exceed this objective, we have created a novel virtual reality environment that emulates today's physical military command post, referred to hereafter as the Virtual Command Post ("VCP").

Since the VCP exists as software and data on a network there is no physical or logistical demands placed on the commander or staff to transport, erect, and configure tons of equipment. This saves time in critical operations such as landing or short ground wars (as demonstrated by Panama, Grenada and Desert Storm).

The VCP is a simulation of an actual command post, with all of the instruments and familiar surroundings emulated in function if not in form. The commander and his staff immerse in this environment via virtual reality displays (audio and video) and inputs (microphone, body encoders and pointing devices) connected to individual personal computers.

In accordance with a preferred embodiment of the invention, there are three levels of participants or users, each user level having a different degree of immersion within the virtual environment.

The first type of user, herein the executive level user, has the highest degree of immersion within the virtual environment. The executive lever user corresponds to the commanding officer. The computer terminal apparatus for the executive level participant includes: a wearable computer that is preferably worn on the belt of the user; display means for displaying the virtual work environment and for displaying, in the virtual work environment, animated characters or "avatars" representing other immersed users in attendance in the virtual work environment and for displaying functional objects in the virtual work environment; a data base for prestoring computer information and graphics supporting the appearance of the avatars that populate the virtual work environment as well as for prestoring collateral information such as maps, documents, presentation materials, etc.; software for supporting the structure and layout of the virtual work environment and for supporting interaction of the avatars in the virtual work environment; position tracking means for correlating changes in hand and head movements of the executive level user to the executive level user's assigned avatar in the virtual work environment; audio input/output means for transmitting and receiving voice data to and from the virtual work environment; control means for updating each of the networked computer terminals with the changes in the voice and video information.

In the preferred embodiment, the display means and audio input/output means are preferably combined as a head mounted display (HMD) unit. The executive level user is also provided with at least one virtual reality glove or pointing device equipped with a switchable button which can be activated to signal the computer to perform a desired function. In operation, the executive level user uses the virtual glove and actuable button in a "point and click" fashion to select functional objects displayed in the three dimensional virtual work environment much like how a conventional mouse type cursor control device is used to "point and click" on displayed icons in a two dimensional screen display running in Windows (a trademark of Microsoft Corporation).

The second type of user, herein the operations level user, includes all the same computer terminal apparatus and software as the executive level user and is further provided with a means for entering electronic data into the virtual work environment. This is typically accomplished by using a standard key board, mouse and two dimensional screen display. For some applications it is more efficient to momentarily enter data through a conventional keyboard and mouse rather than attempting to enter data using a virtual keyboard and mouse in the virtual work environment. Because of this added feature, the second or operations level user is said to be a "transitionally or partially immersed" user.

The third type of user, herein the staff level user, is a pseudo-immersed user and is represented as an animated functional object (typically a seated avatar or icon) in the virtual work environment. The staff level user shares most of the essential computer terminal apparatus of the executive and operations level users except that the staff level user does not wear position sensors nor is the staff level user provided with a display of the virtual work environment. The function of the staff level user is to gather information upon demand and to provide the gathered information as an electronic data stream to the virtual work environment. The avatars in the virtual work environment can view the "in progress" work of the staff level user in real time by simply "clicking on" the displayed functional object (i.e., seated avatar or icon) representing that particular staff level user. This information can be projected on a virtual screen display or video wall for viewing by all the other avatars in the virtual work environment.

The staff level user would be a person sitting at a remote computer terminal having a conventional keyboard and display. The staff level computer apparatus include audio input/output means to permit the staff level user to communicate with other users of the virtual work environment.

Both the executive and operations level users are provided with a personal set of virtual tools, embodied in software, that allow these users to perform many work activities while immersed in the virtual environment, such as making a phone call, sending a page or printing a document. The executive and operations level users are also provided with a global set of tools, embodied in software, which are effective to facilitate a number of tasks in the virtual environment including: avatar conferencing; interactive presentations; configuring staff; configuring communications both inside and outside the virtual environment; recording, playing and controlling live and canned images to and from the real world; transmitting and receiving electronic and audio data streams to and from the real world; and maintaining a video and audio record of events occurring in the virtual environment.

The computers for each participant are networked to other command participants via military networks. This strategy is very advantageous as it allows C4I elements to continuously operate from a home base, while in transit, during landing, and while deploying in operation. This time advantage directly contributes to the joint situational awareness and the ability to rapidly and effectively project force in battle. Military history has clearly shown that when command elements are disrupted or in disarray, infantry casualties are high and battle outcome is questionable. Continuous fluid C4I provided by the VCP gives the commander the edge of continuous control of troops and the battle.

While the VCP is a synthetic command post environment, the results of the collaborative work is analogous to a real command post. All operation of artillery, air defense, intelligence, maneuver and control, and logistics are carried out exclusively while immersed in the VCP environment. The result of VCP operation is the generation of orders, voice command, documents and maps, fire control data, and the ability for Avatars to travel instantaneously to other VCPs.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

The following describes a preferred embodiment of the invention wherein a virtual environment is created to emulate the layout, appearance, function and hierarchical structure of a work place, in this case, an actual military command post. The emulation of the form and function of a military command post environment is by no means the only application of the present invention. It should be understood that the principles and inventive concepts of the present invention can be easily adapted to create a wide variety of virtual work place environments, such as for example, large and small business office environments.

Figure 1:
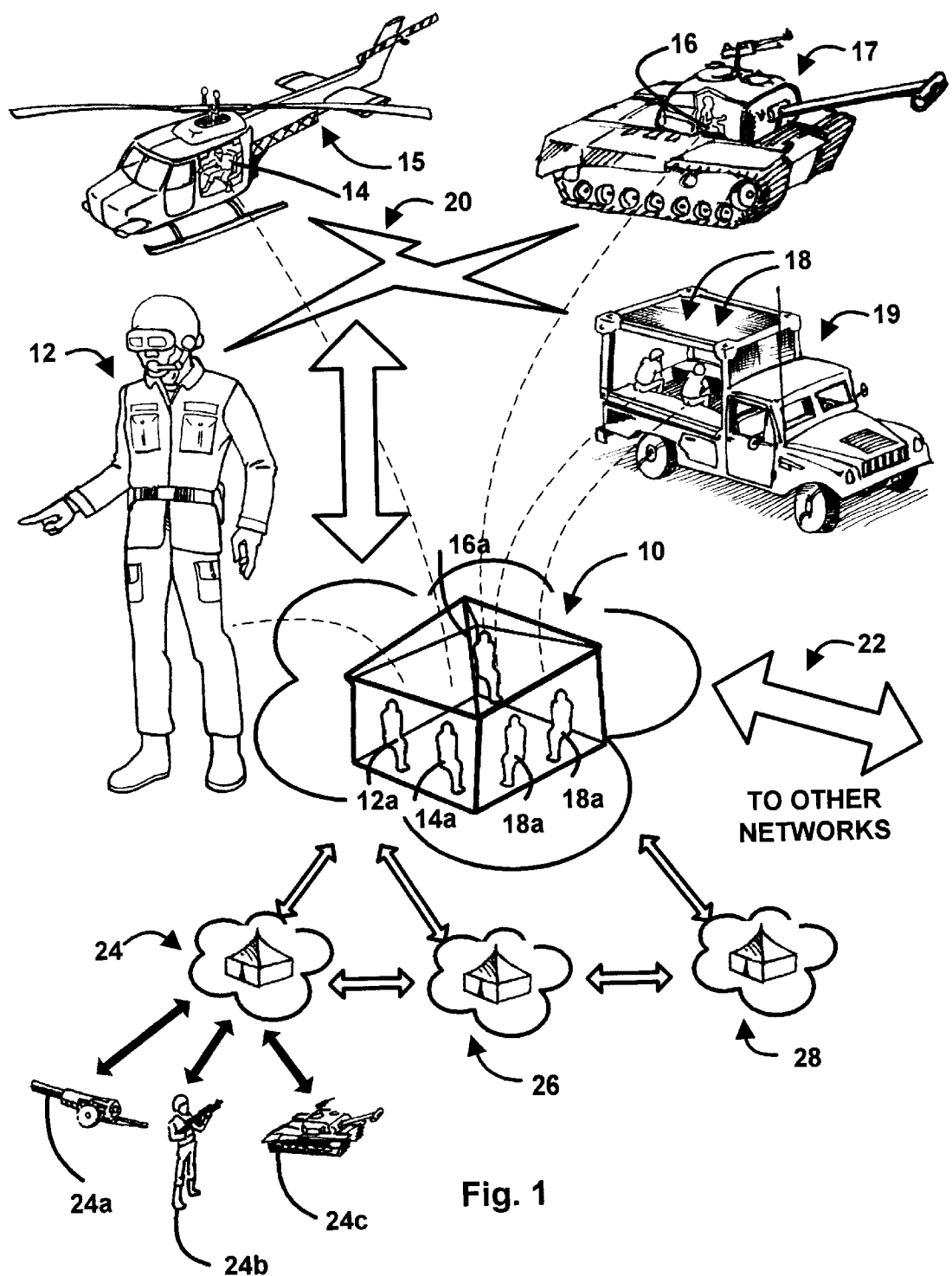
FIG. 1 is a diagrammatic illustration of a virtual command post (herein referred to as "VCP") illustrating the utilization of a number of computer equipped users and the communications links for networking the users to the VCP environment.

Referring to FIG. 1, there is shown a diagrammatic illustration of the Virtual Command Post ("VCP") and the hardware and communications for linking real world participants to the VCP environment.

A VCP in accordance with one embodiment of the presented invention is represented by the bubble 10 shown in the center of FIG. 1. The VCP 10 allows remote and dispersed command staff to meet instantly, without delay due to travel, for missions, planing, training and rehearsals. As illustrated in this example, a plurality of real world users may participate and collaborate in the VCP 10. The kind of real world users, for example, may include: a dismounted self-contained participant 12; personnel 14 within a command aircraft 15; personnel 16 within a command land vehicle or tank 17; and personnel 18 within a mobile communications shelter 19. Each of the VCP participants 12, 14, 16, and 18 are radio-linked to one another as indicated by the communications lightening bolt 20. In addition, each VCP participant 12, 14, 16 and 18 is represented by a respective animated character or avatar 12a, 14a, 16a and 18a inside the VCP 10. This is indicated by the dashed lines connecting the VCP participants 12, 14, 16, and 18 with their respective avatars 12a, 14a, 16a, and 18a in the VCP bubble 10. The specific level of immersion of each participant within the VCP will vary in accordance with their job function.

The VCP 10 depicted in FIG. 1 represents a local network for the depicted participants 12, 14, 16 and 18. The local VCP 10 may be linked to "other networks" as indicated by arrow 22. The "other networks" may comprise other remote VCPs or video and audio communication data streams that would come from space, theater and /or national resources.

In addition, subordinate VCPs 24, 26, and 28 may be linked to the local VCP 10. The information prepared and processed by the local VCP 10 is received and further refined by the designated subordinate VCPs 24, 26, and 28 where it is eventually transmitted as orders to subordinate operational elements, such as, for example, artillery unit 24a, infantry unit 24b, and tank unit 24c. The trickle down model or control hierarchy described herein whereby a single local VCP controls the flow of processed information to three subordinate VCPs is a typical model of the military. It is understood that this hierarchial model is capable of variation and adaption for use in other structured work environments, such as for example, the business office work environment noted above.

Figure 2A:
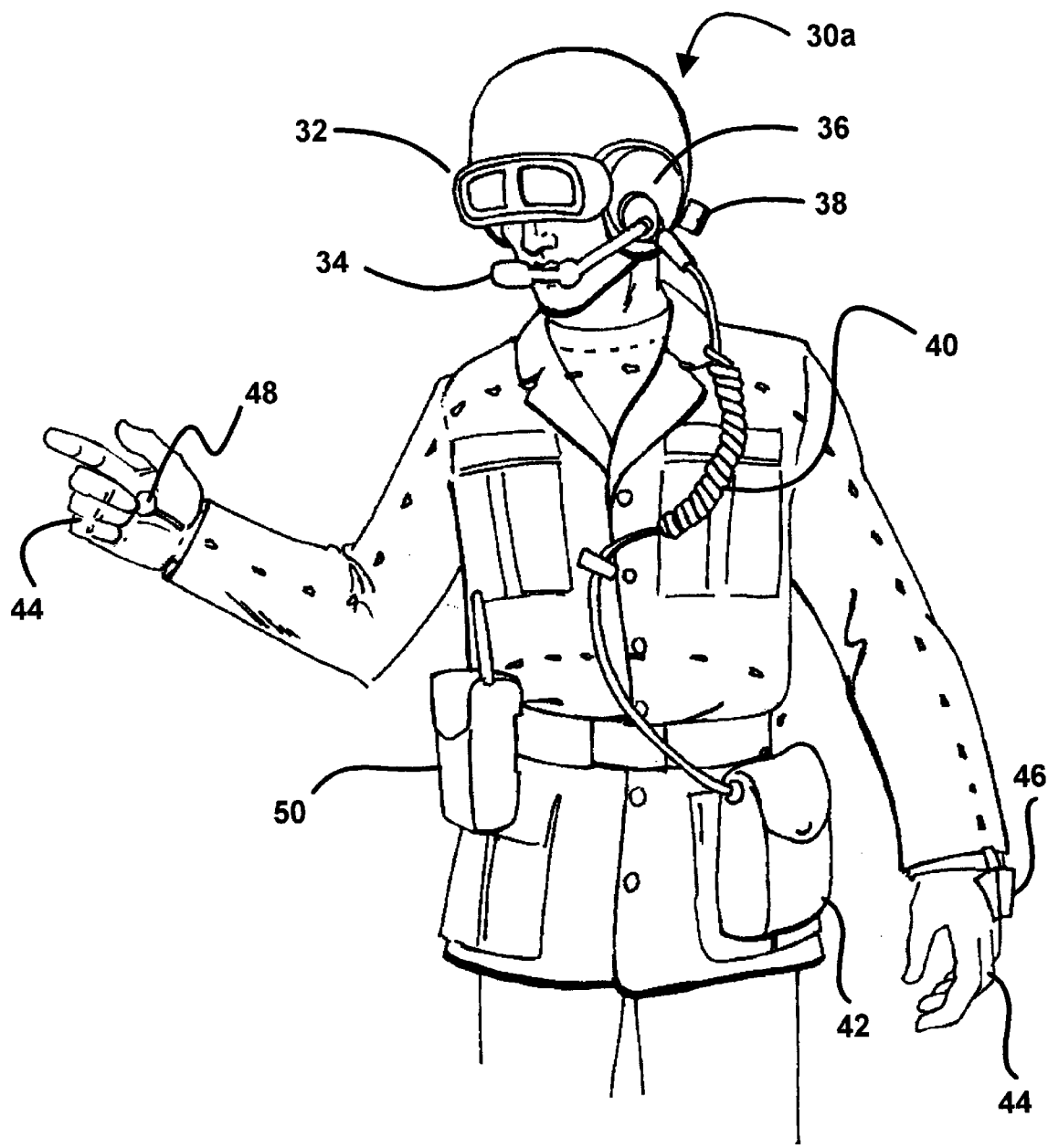
FIG. 2A is an illustration of the terminal apparatus and virtual reality hardware for a first or executive level user of the VCP.

FIG. 2A shows a first or executive level user 30a of the VCP 10. The executive level user 30a has the greatest amount of immersion within the virtual environment. In the present example wherein the virtual environment is a simulation of a military command post, the executive level user 30a would be the highest ranking officer, such as a general. In accordance with this scenario, the executive level user 30a would not prepare their own information but rather has the information presented to them by subordinate users of the VCP.

The executive level user 30a is equipped with virtual reality gear to provide full sensory (audio, visual, tactile) input and output capability for complete immersion within the virtual environment. The virtual reality gear provided to the executive level user includes a head mounted display ("HMD") 32 that provides a video stream to the eyes. This video stream provides a three dimensional image that allows the executive level user to think that he is in the virtual world as it would really exist. Also provided is a boom-mounted microphone 34 for projecting voice data into the virtual environment and head phones 36 for hearing other users talking inside the virtual environment. A head tracker 38 tracks motion of the head as the executive lever user 30a looks from side to side and up and down. Visual and audio data transmission to and from the HMD 32, microphone 34 and headphones 36 is carried over cord 40 connected to a wearable personnel computer 42. In accordance with the present invention, the wearable computer 42 is provided with processing power sufficient to handle graphics intensive multi-media applications.

The executive level user 30a is also provided with virtual fingerless gloves 44. Each virtual glove 44 includes a hand tracker 46 which, like the head tracker 38, tracks the movement of the user's hands. In addition, at least one of the virtual gloves 44 includes a switch activated button 46. The activation of button 46 signals the computer 42 to select functional objects displayed in the virtual environment. This feature will be described in more detail with reference to FIG. 4 below.

The executive user 30a is further provided with a radio and modem 50 that is linked to the wearable computer 42 and that is effective to transmit updated changes in voice and position data via the network to the personal computers of all the other users in attendance in the virtual environment.

Figure 2B:
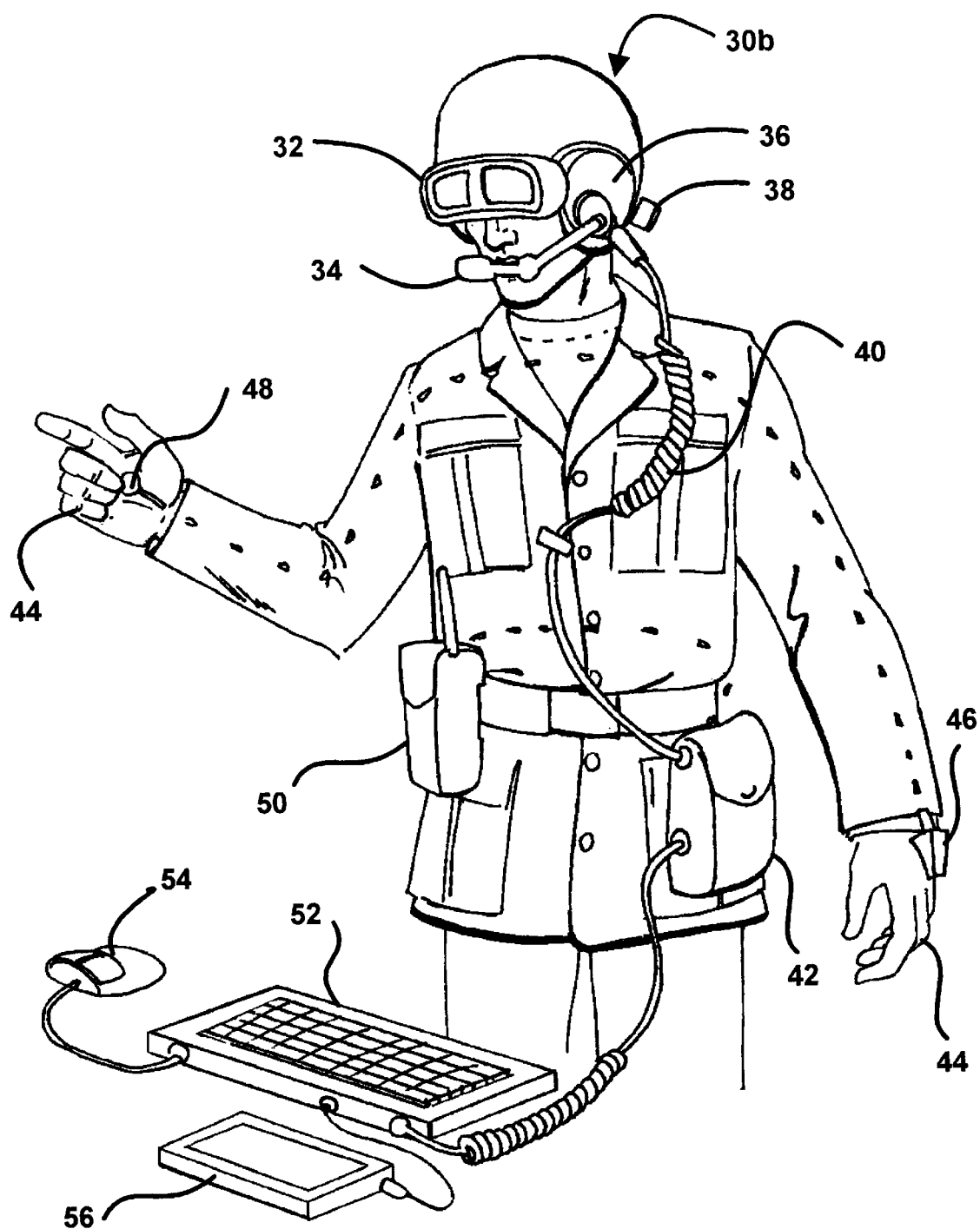
FIG. 2B is an illustration of the terminal apparatus and virtual reality hardware for a second or operations level user of the VCP.

FIG. 2B illustrates the hardware for a second, operations level user 30b. The operations level user 30b is provided with all the same virtual reality gear and computer equipment as the executive level user 30 shown in FIG. 2A. The main difference between the operations lever user 30b and the executive level user 30a is that the operations level user 30b is further provided with means for entering data into the VCP. In the preferred embodiment, the data entering means provided to the operations level user 30b comprises an optional key board 52, mouse 54, and screen display 56. The keyboard 52, mouse 54 and screen display 56 allow the operations level user 30b three modes of data display and entry including: (1) external data entry via a mouse and keyboard to VCP screen display; (2) external VCP display of data via screen display; and (3) external operation of VCP via keyboard, mouse and screen display. For some applications, it is more efficient to enter and process information using a conventional keyboard and mouse rather than attempting to enter and process this information on a virtual keyboard and mouse while inside the virtual environment. The fingerless gloves 44 permit good manual dexterity which allow the operations level user 30b to operate the keyboard 52 and mouse 54 without having to remove their virtual gloves 44.

In use, the operations level user 30b may cast their eyes below the HMD 32 in order to operate the optional keyboard 52 and mouse 54 and view his work on the conventional screen display 56. In this way, the operations level user 30b is said to be partially immersed in the virtual environment. Of course, it is understood that the operations level user 30b may be provided other forms of external data entry means in place of or as a supplement to the keyboard, mouse and screen explicitly disclosed herein. The alternate forms of data entry may include pressure sensitive user graphical interfaces (i.e., "touch screens"), bar code readers, etc.

Figure 2C:
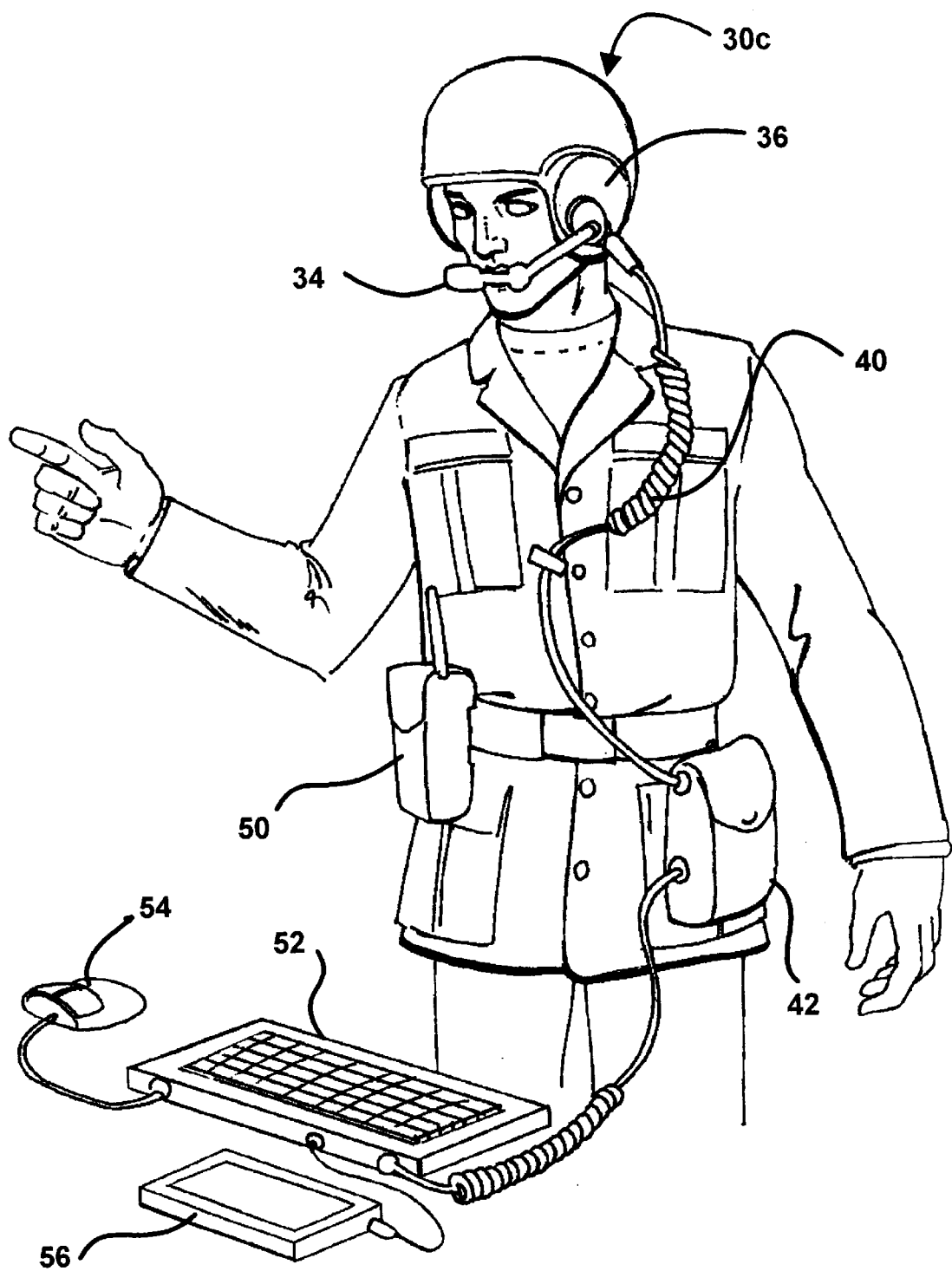
FIG. 2C is an illustration of the terminal apparatus and virtual reality hardware for a third or staff level user of the VCP.

FIG. 2C illustrates the hardware for a third, staff level user 30c. The staff level user 30c represents a person who would be very restricted in the level of immersion that they have with the virtual environment. The staff level user 30c is equipped with a microphone 34 and headphones 36 for communicating and receiving audio information to and from the virtual environment. It is the function of the staff level user 30c to enter raw data at the request of a higher level user of the VCP, such as an operations level user 30b. In accordance with the preferred embodiment of the invention, the staff level user 30c will be displayed as either a seated avatar or icon in the virtual environment. An operations level user 30b may, through his avatar, select the seated avatar or icon corresponding to the desired staff level user in order to retrieve and display in the VCP the contents of the information that the selected staff level user is currently preparing.

As an example of how this works, the staff level user 30c may be a logistics sergeant responsible for walking through an actual warehouse and collecting and entering warehouse inventory information into the system by using the keyboard, mouse or some other type of input device such as a bar code scanner. In this scenario, the logistics sergeant corresponds to a staff level user 30c and he would appear as a seated avatar or selectable icon in the virtual environment. In actuality, the logistics sergeant could be thousands of miles away collecting and inputting this information into the VCP. At the same time, other remote staff level users 30c (also displayed as seated avatars or icons in the VCP) could be entering into the VCP other types of data, such as map data, weather data, intelligence data or troop data, relevant to a particular mission of interest. The information input into the virtual environment by all of these staff lever users can be viewed and formatted by higher level users, such as operations level users 30b. This information is used by operations level users 30b for making presentations to and/or for briefing other higher level users, such as other operations level users 30b and executive level users 30a, for collaborative decision making.

Figure 3A:
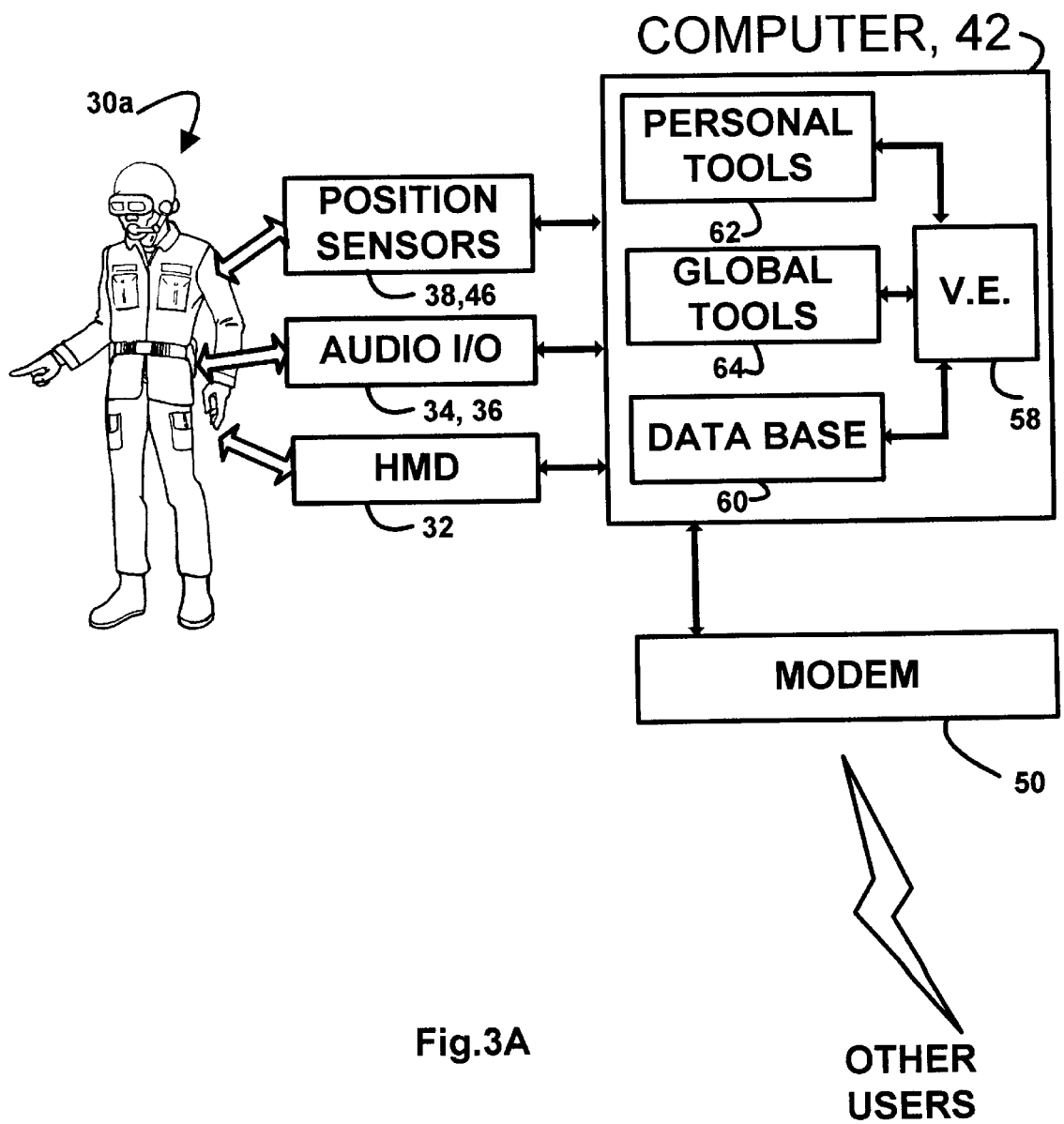
FIG. 3A is a block diagram schematically illustrating the constitution of the computer and peripheral devices for the first or executive level user of the VCP shown in FIG. 2A.
Figure 3B:
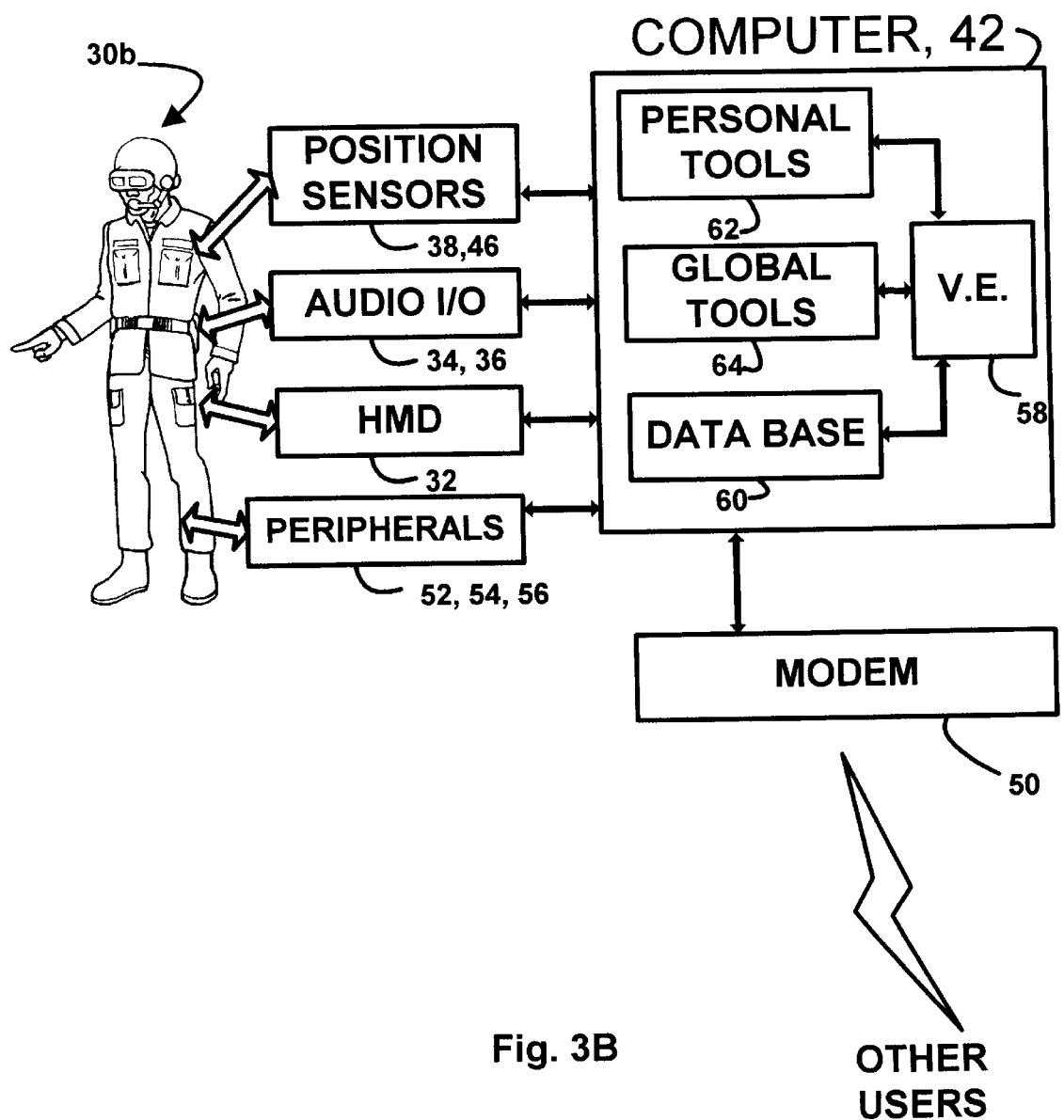
FIG. 3B is a block diagram schematically illustrating the constitution of the computer and peripheral devices for the second or operations level user of the VCP shown in FIG. 2B.
Figure 3C:
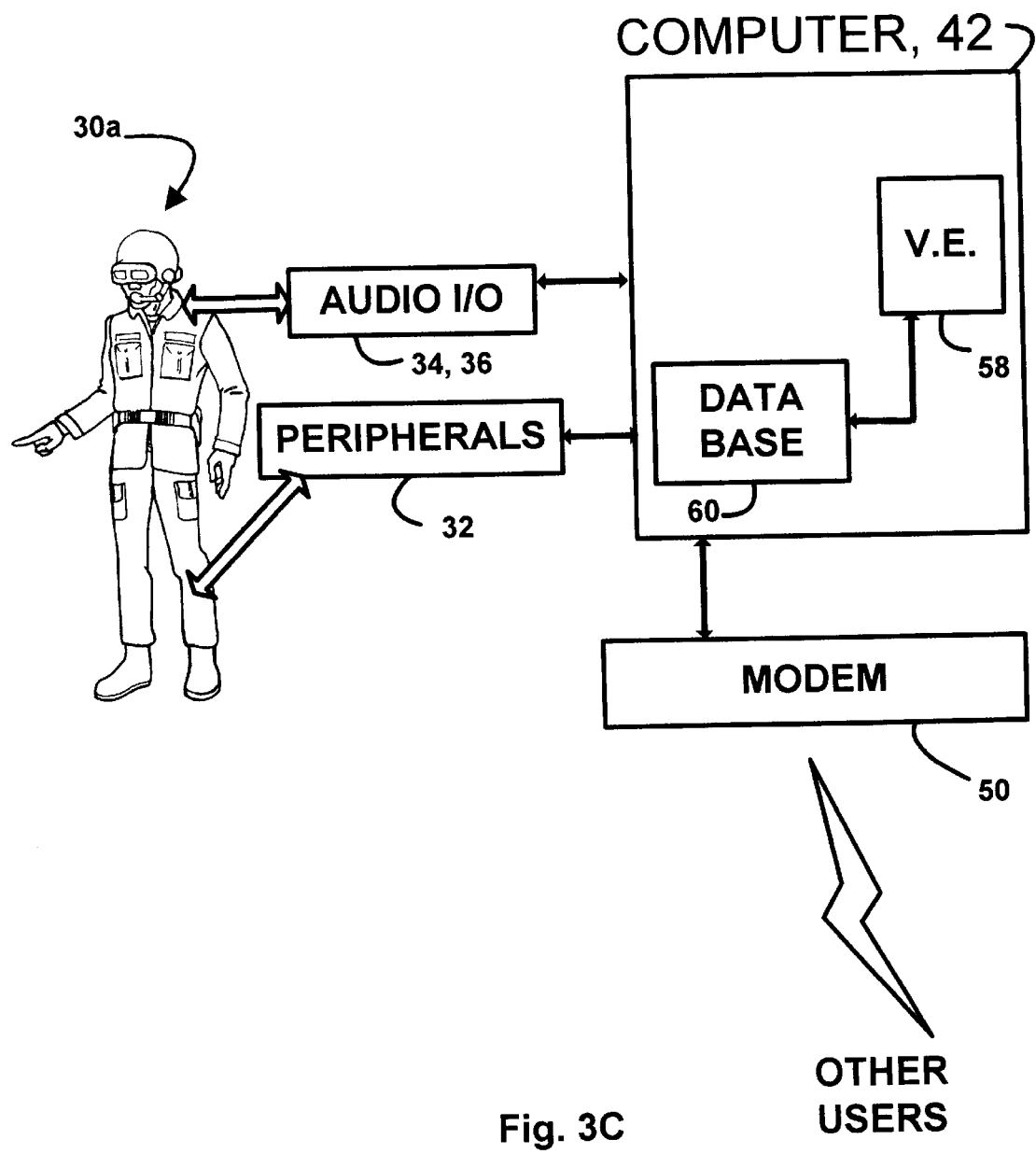
FIG. 3C is a block diagram schematically illustrating the constitution of the computer and peripheral devices for the third or staff level user of the VCP shown in FIG. 2C.

FIGS. 3A–C are block diagrams which illustrate the respective computer system configurations for the executive level user 30a (FIG. 3A), the operations level user 30b (FIG. 3B), and the staff level user 30c (FIG. 3C).

Each level user is provided with a computer system 42 comprising a virtual environment (V.E.) software module 58, a database 60, memory (not shown) and a processor (also not shown). The V.E. software module 58 supports the structure and layout of the VCP and how the animated characters or avatars interact in the virtual environment. Database 60 contains the information for the appearance of the avatars that would populate the virtual environment as well as collateral information such as maps, documents, presentation materials, etc. A basic computer model or avatar for each user is pre-stored on each user's database. Transmission of bandwidth intensive full frame video is unnecessary since only the changes in position data (as detected by the head trackers 38 and hand trackers 46) is sent over the local network to update avatar movements on each user's computer.

In accordance with a preferred embodiment of the invention, the V.E. software module 58 supports a simulation of a command post environment that includes an elevated commander's bridge surrounded by four quadrants, herein referred to as work areas or rooms of the virtual command post. In the example embodiment described herein, the four rooms are designated as the Command Room, the Control Room, the Communications Room and the Cognition Room. Each room is equipped with avatar selectable transportation sites, avatar selectable functional objects and avatar selectable plural video walls or screens which are used for displaying live video stream, canned images, presentation data, etc. The various simulated rooms of the VCP provide all the functionality of their real life counterparts.

The computer system 42 for each of the executive level user 30a and operations level user 30b further includes software modules that support a set of personal virtual tools 62 which allow the users thereof to perform personal tasks not affecting the group while immersed in the VCP and a set of global tools 64 which enable the users thereof to perform simultaneous collaborative tasks with the other users while immersed in the VCP.

A commander avatar, such as an executive level or operations level user's avatar, may stand on the simulated commander's bridge and view what is going on in each work area or room of the VCP. From his position on the elevated commander's bridge, the avatar through the use of the personal and global tools, can transport himself to any room of the VCP, interact with displayed functional objects and/or communicate with staff level users that are virtually present in each of the rooms of the VCP.

Figure 4:
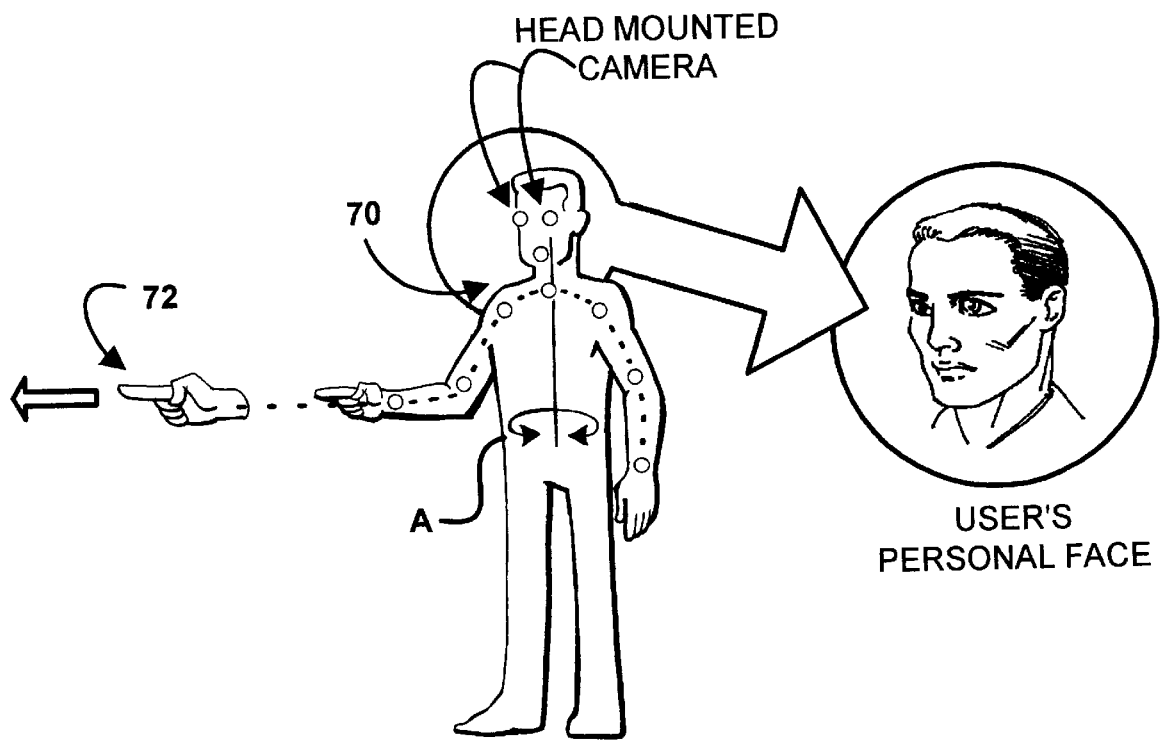
FIG. 4 is a schematic diagram of an avatar in the VCP illustrating the control of body movements of the avatar and also illustrating how an avatar uses an exaggerated pointer for selecting and/or manipulating functional objects displayed in the VCP.

FIG. 4 illustrates the control and operation of an avatar 70 in the virtual work environment. When an executive level user 30a or operations level user 30b initially immerses into the virtual environment, a pre-stored model of the user's facial features is downloaded to all users of the local network so that these other users are able to see the immersing user's personalized face displayed on his avatar 70. A user's avatar 70 pivots about a longitudinal axis (as indicated by double arrow A) in response to changes in motion data detected by the user's head tracker 38 (see FIGS. 2A and 2B). This occurs, for example, when the user turns his head in order to view a different work area or room of the virtual environment. The arms of the user's avatar 70 move through a series of articulated joints in response to changes in motion data detected by the user's hand trackers 46 (see FIGS. 2A and 2B).

In accordance with a preferred embodiment of the invention, there are two modes of avatar movement: (1) free movement and (2) selected site transportation. In accordance with free movement mode, the avatar 70 may move freely about the virtual command post environment and is constrained only by the limits of the virtual reality gear of the user/wearer and/or the physical obstacles in the vicinity of the user/wearer of the virtual reality gear. In accordance with the selected site transportation mode, the avatar may use an exaggerated pointer 72 to point to a designated site and transport himself to that site by actuating the switchable button 48 provided in their virtual glove 44. The exaggerated pointer 72 is represented as a simulated laser finger. The button depression activates a switch which signals the avatar's computer to execute the function to make the appropriate change in the viewpoint perspective of the avatar 70. As will be discussed in more detail below, each room of the virtual command post includes one or more selectable transportation sites (e.g. displayed pedestals, chairs, etc.). Also, the elevated commander's bridge is designated as a home base transportation site.

FIG. 4 also shows how an avatar 70 uses the exaggerated pointer 72 to point to and select functional objects displayed in the virtual environment. In use, a functional object displayed in the virtual environment is selected when the avatar 70 points his exaggerated pointer or laser finger 72 to that particular functional object and then actuates the switchable button 48 provided in their virtual glove 44. The button depression activates a switch which signals the avatar's computer to execute the function represented by the functional object displayed in the virtual environment.

As noted earlier, the functional objects displayed in the virtual environment may include seated avatars or icons representing staff level users or functional non-human entities referred to herein as "intelligent agents". The intelligent agents may include menu-driven computer programs such as search engines linked to other networks including global networks like the Internet. Other functional objects include displayed buttons such as projection icons which may be selected to project images and information onto video walls or projection screens displayed in the various work areas or rooms of the virtual environment. Once a selection of a displayed functional object has been made, this change in status information concerning the selected functional object is then updated on the other user's computer via the local network. The above described object selection process is analogous to the well known "point and click" graphical user interface method wherein a mouse-type input device is used for positioning a cursor element and selecting icons displayed on a two dimensional screen display.

Personal Tools

The personal tools 62 referred to above are basically a set of software modules specially adapted for use by the executive and operations level users 30a, 30b. The personal tools 62 are for the automation and enhancement of the individual user task, rather than for the contribution of the group and these tools are only viewed and used by the local user. A user may operate their personal tool set while immersed in the VCP environment, however, use of the personal tools do not globally affect others in the VCP environment. In other words, use of the personal tools by a user is generally invisible to the other users.

Fundamental to the privacy or use of the personal tools is user identification. When a user immerses into the VCP environment, there is an initial identification process that takes place whereby the user is identified by some characteristic unique to the individual. Exemplary devices that may be used to identified some unique user characteristic of a user include fingerprint scanners, electric cardiogram devices which identify someone by their electric cardiogram signal, or a retina scanners. Once the identification process is complete, the VCP creates or downloads an avatar that has the appearance of the identified user. The identification process is a security clearance that, one completed, allows the identified user to access files and information for which he is authorized. The identification process also signals other users of the VCP that this particular identified user has become immersed in the environment an is able to accept communications.

In accordance with a preferred embodiment of the invention, each personal tool set 62 includes: a radio and phone which allow for communications outside of the VCP; a pager for receiving pages originating from outside the VCP; an audio/video recorder for recording VCP sessions for later play back; a clipboard on which a user can draw, write and enter typed data from their own computer and also for storing images and documents from the VCP; a files feature for performing computer file transfer functions; and a printer for printing documents to a user's printer.

The phone and pager function relays telephone or pager communications to an immersed user without requiring the immersed user to first remove themselves from the virtual environment in order to use the phone or view a page. So, for example, if an immersed user had a cellular phone, the cellular phone would plug into the personal computer. When the phone rings, an appropriate message would be received by the user's local computer and it would be relayed through the audio receiver to the user's avatar. Taking an incoming call from the outside world disengages the audio linked to the VCP for that particular user so that a user receiving a call would be able to carry on a conversation with an outside person without the conversation being overheard by other users immersed in the virtual environment. In the virtual environment, a phone icon would be displayed next to the avatar receiving a call signalling to other users that the avatar is receiving a private phone call.

The page function allows a user to receive a page through to the virtual environment. A pager, similar to a large wrist watch, might be worn on the wrist of the user. If the user got a page, he could look at his wrist and see who paged him. The radio function allows a user to control their personal radio communications to other VCPs or others in the outside world. The personal version of the audio video recorder allows the user to record events in the virtual environment as by eyes of his avatar. There is also a clipboard file transfer function that allows a user to pass documents to and from the virtual world from a clipboard. So if a user wanted to save something that he wanted to fax or print at some later time, he could save it to his personal clipboard. Alternately, if the user wanted to print it directly, he could do this by controlling his personal printer.

Figure 5A:
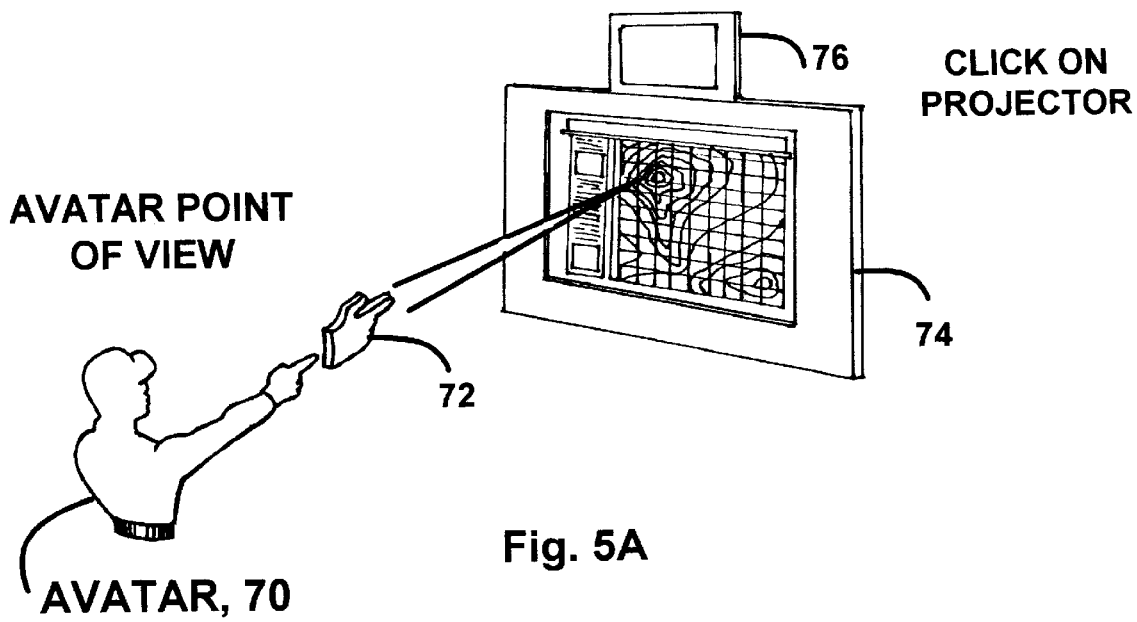
FIG. 5A is a diagrammatic view illustrating the zoom lock function of the VCP which is enabled when an avatar in the VCP uses the exaggerated pointer to zoom in on images that are projected on video walls or screens in the VCP.
Figure 5B:
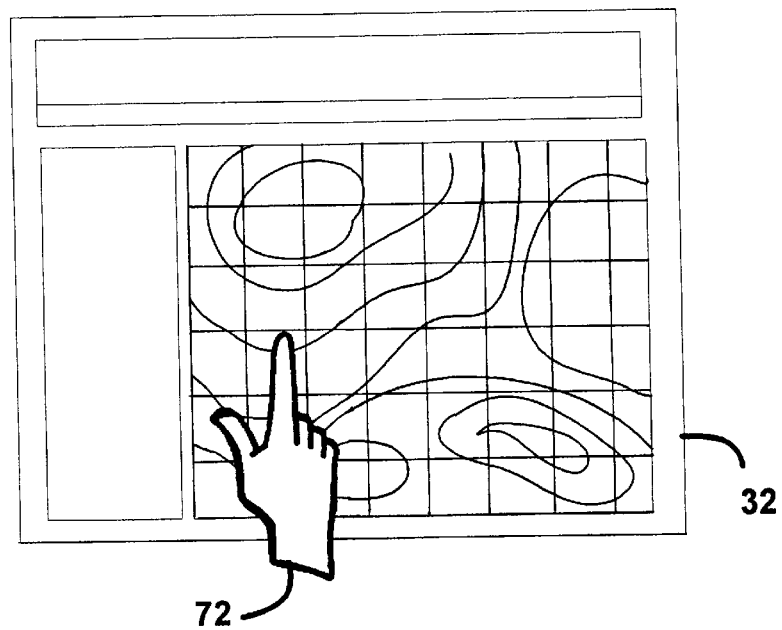
FIG. 5B is a view of the zoom locked image of FIG. 5A as would be displayed on the head mounted display of the user corresponding to the selecting avatar.
Figure 5C:
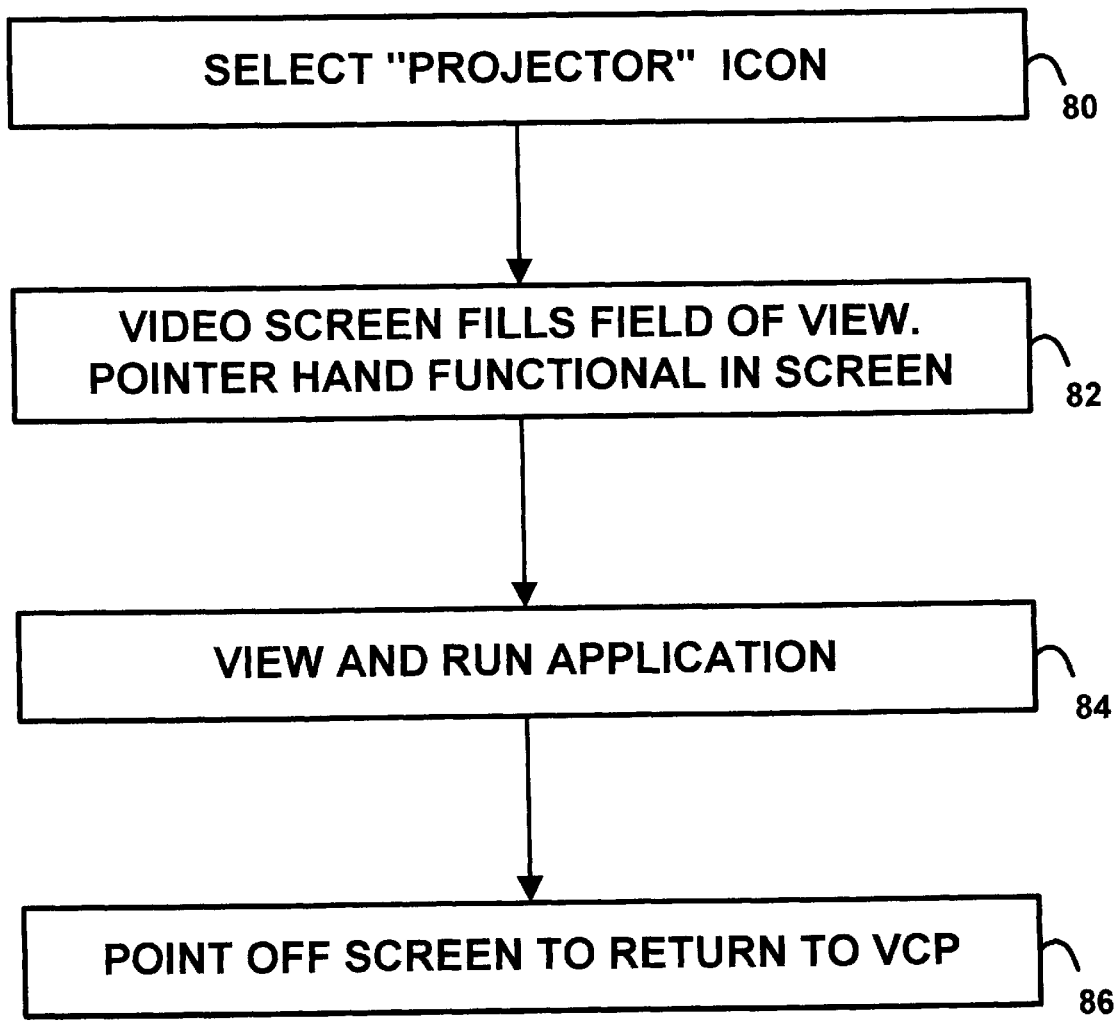
FIG. 5C is a flow diagram illustrating the preferred method for zoom locking images displayed on video walls or screens in the VCP in accordance with the present invention.

Referring to FIGS. 5A–5C, there is illustrated another important personal tool referred to herein as the zoom lock function. As noted above, the VE software supports a simulation of video walls or screens that are displayed as functional objects in the virtual environment. As shown in FIG. 5A, the zoom lock function enables an avatar 70, via his exaggerated pointer 72, to select a video wall or screen 74 that is displayed in any work area or room of the VCP and lock on to the image displayed on the selected video wall or screen. This function is performed by pointing the exaggerated pointer 72 to a displayed screen projector icon 76 associated with the video wall 74. The locked image can be zoomed in to fill the limits of the selecting user's HMD 32. This is shown in FIG. 5B. The zoom lock function transforms the avatar's normal three dimensional view of the distant video wall and surrounding area into an enlarged two dimensional display. At the same time, the user's the exaggerated pointer 72 becomes a two dimensional reference indicator that moves about the screen in response to either (1) the user's hand movements (via the hand trackers) or optionally, (2) the user's mouse operation, in the case of an operations level user.

The zoom lock function is equivalent to walking up very close to a large screen for a close up inspection. Any avatar 70 can zoom lock a screen by using the exaggerated pointer 72 and clicking on the projector icon 76 for that screen or video wall. In this way, an avatar standing on the commander's bridge would be able to zoom in on critical information displayed on a distant screen in one of the work areas without having to physically leave the commander's bridge. The zoom locked view of one selecting avatar does not affect the view of the VCP of the other avatars. In addition, multiple avatars are able to zoom lock on the same video wall or screen and they can collaboratively or independently operate or manipulate the screen image. So, for example, if a user is giving a presentation and the user puts up a slide of a map for display on a video wall or screen, other users might have different reasons for looking the map. Each user is able to zoom lock the map to look for the information relevant to their needs. One user may be looking at the map to verify mobility conditions, while another user may be looking at the map to check for weather effects, while still another user may be looking at the map to consider communications effects. In this situation, each user will zoom lock the displayed map for independent reasons.

An example of a collaborative work situation might be where an engineer viewing a displayed map looks at the map terrain and notes that all bridges have been destroyed and makes a suggestion to put in new bridges at locations A, B, and C. A person responsible for commanding the troops might then point out that the troops are not able to move to the proposed bridge locations and instead propose to ferry the troops across the river by helicopter. Next, the aviation person would look at the map in order to confirm helicopter landing and take off zones on both sides of the river to determine feasibility of an airborne operation. It is not necessary for the three persons in the above described scenario to be in the same area of the VCP. They only require the ability to zoom lock a particular screen to collaboratively solve this problem. This is easily done is the user's avatar is initially on the elevated commander's bridge, since they only need to turn their head to view all the video walls or screens in the various rooms of the VCP.

In addition, any video wall or screen of the VCP can display a working application. For this case, each user could operate the application independently or collaboratively depending on their needs.

FIG. 5C illustrates a simple flow diagram of the zoom lock function. To begin the zoom lock function, the user uses their exaggerated pointer 72 to select the projector icon 76 at step 80. This causes the video screen to fill the field of view of the user's HMD 32 and activates the pointer 72 as a cursor element in the two dimensional screen (step 82). The user can then view and run applications on the screen at step 84. To disengage or exit the zoom lock mode, the user points the cursor 72 off screen to return to the VCP environment (step 86).

Global Tools

Figure 6:
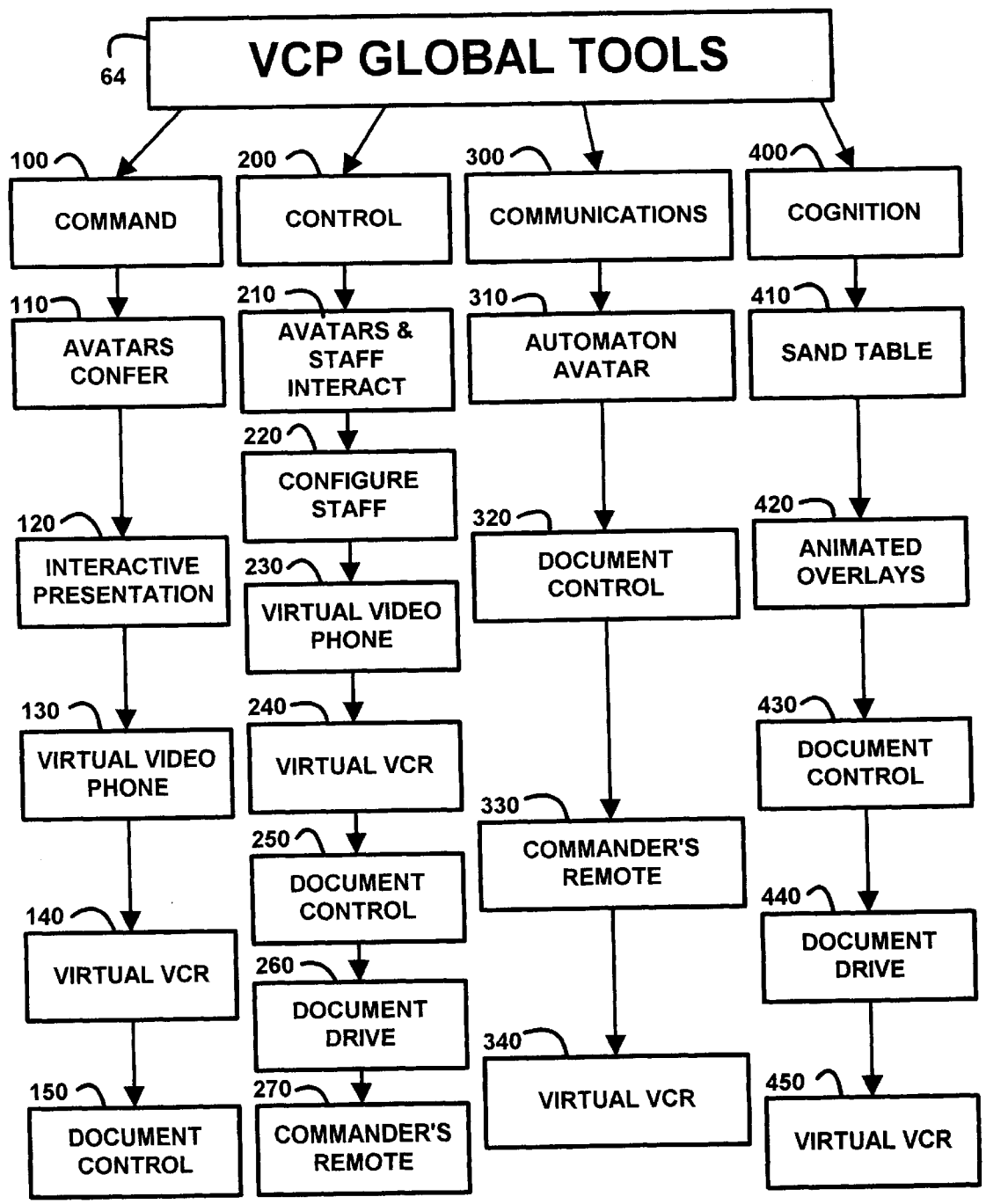
FIG. 6 is a block diagram illustrating the functional applications or global tools utilized by users of the VCP in accordance with the present invention.

Referring now to FIG. 6, a preferred embodiment of the global tools 64 in accordance with the present invention is shown to include four sections identified as the Command section 100, the Control section 200, the Communications section 300 and the Cognition section 400. Each section is responsible for a simulated room or work area in the virtual command post where collaborative work for a particular type of command post activity takes place. For example, the Command section 100 includes global tools specific to presentations, briefings and related activity that take place in the Command Room 102 (see FIG. 7). The Control section 200 includes global tools specific to the tasks of controlling data flow and staff utilization which occur in the Control Room 202 (see FIG. 8). The Communications section 300 includes global tools specific to the tasks of coordination and control of networks and communications that take place in the Communications Room 302 (see FIG. 9). The Cognition section 400 includes global tools specific to the tasks of planning and strategy that take place in the Cognition Room 402 (see FIG. 10).

Command Room

Figure 7:
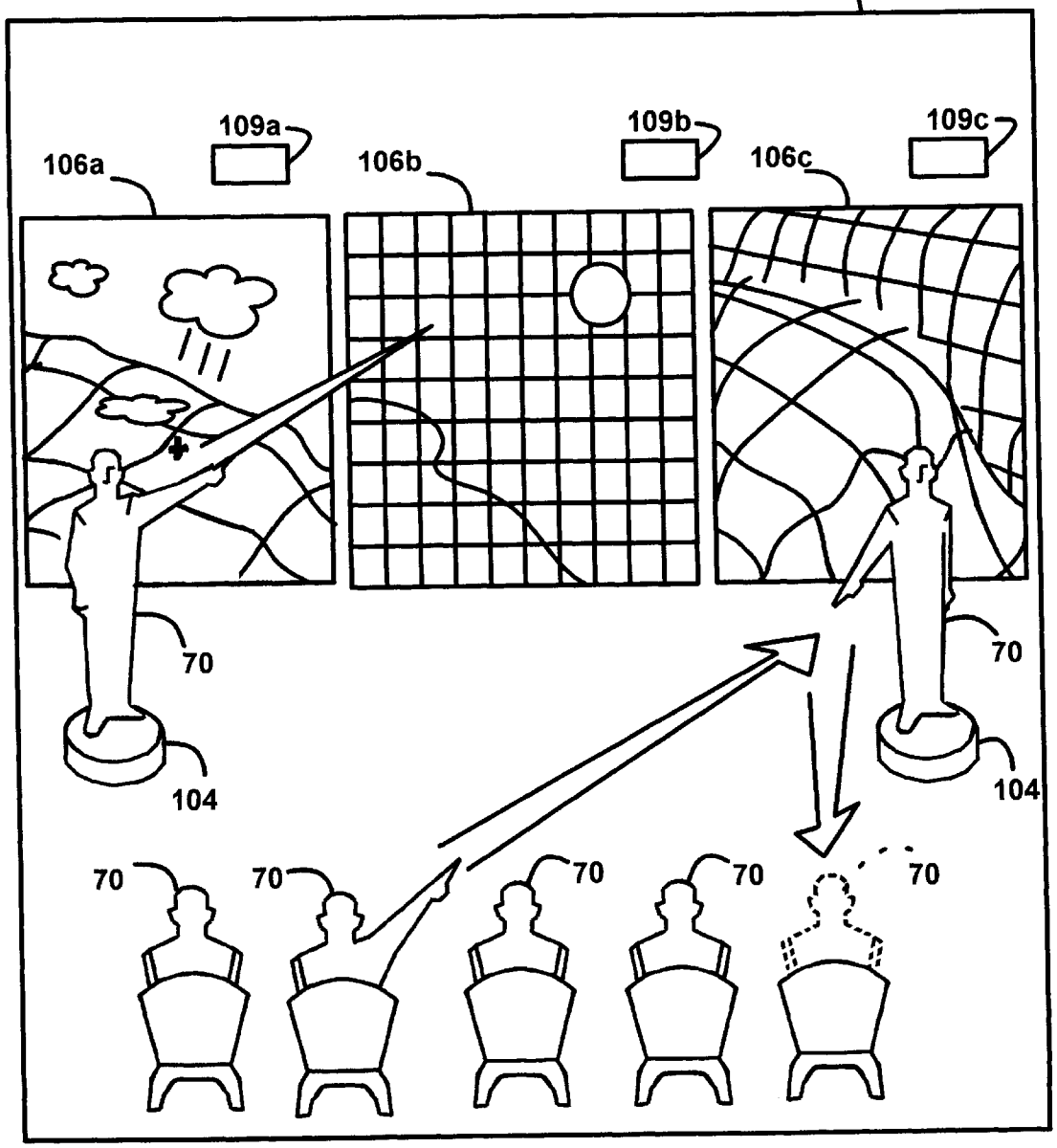
FIG. 7 illustrates a simulation of the Command Room within the VCP in accordance with the present invention.

With reference to both FIGS. 6 and 7, the Command section 100 controls the presentation and briefing activities that take place in the Command Room 102. In accordance with the present invention, the simulated Command Room 102 is set up to coordinate high level communications between echelons of command in a setting consistent with traditional Army presentation and protocol. Multiple echelons of command are instantly linked for command guidance, recommendations, and orders.

Among the global tools that are available under the Command section 100 is Avatar Confer 110. Avatar Confer 110 allows the avatars 70 in the Command room 102 to freely interact and have discussion with one another.

Figure 7A:
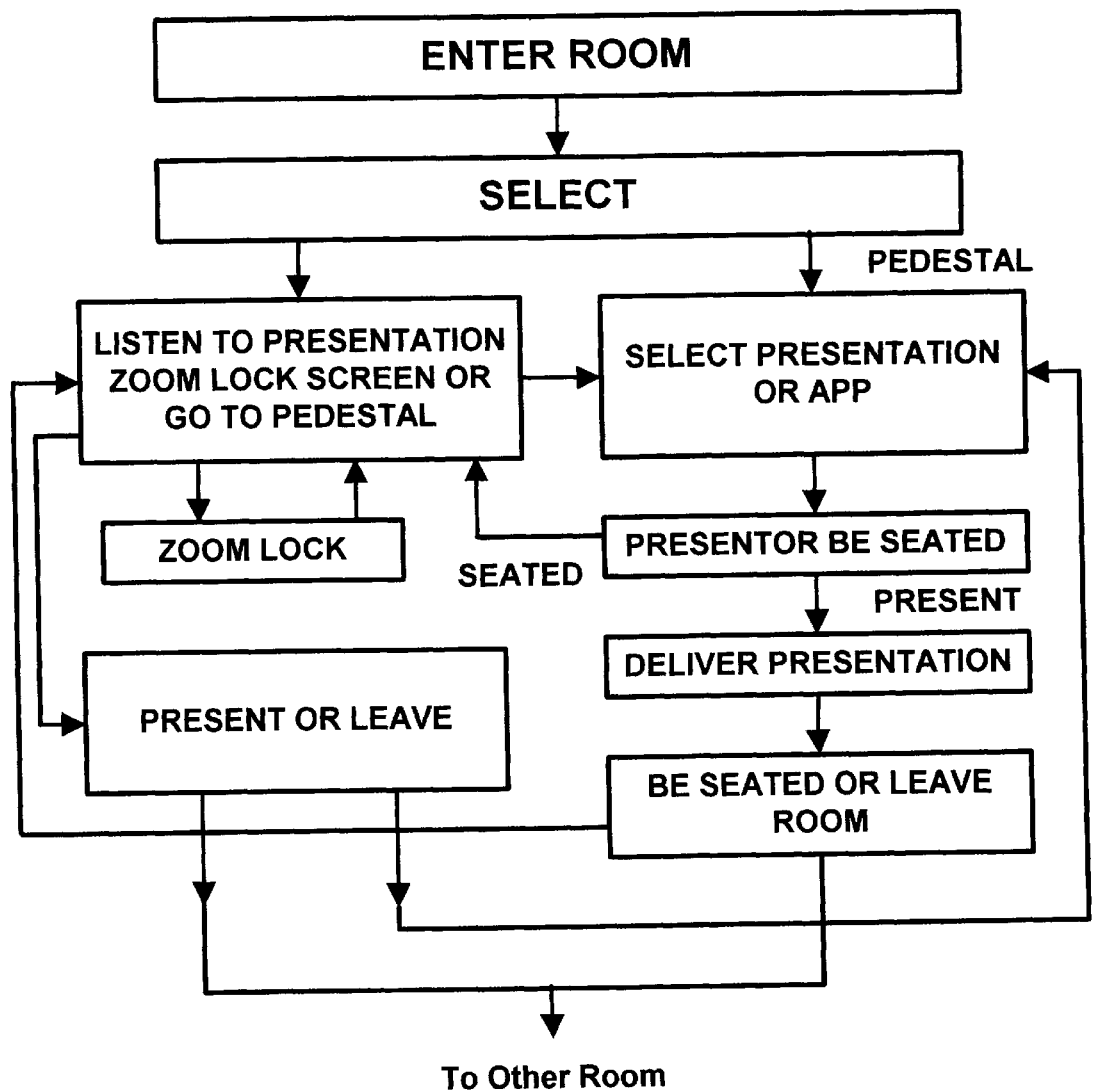
FIG. 7A is a flow diagram illustrating the flow of presentations and briefings by users while present in the Command Room of the VCP.

Another global tool in the Command section 100 is Interactive Presentation 120. Interactive Presentation 130 allows for the interactive and dynamic presentation of information and options by one or more avatars 70 for discussion and decision in the Command Room 102. In accordance with Interactive Presentation 120, an avatar 70 wishing to make a presentation to the group stands on one of the two pedestals 104. The standing avatar(s) 70 present materials on the video walls or screens 106a, 106b, 106c and select and drive the presentation materials using their exaggerated pointer 72. The seated avatars 70 receive the information presented to them by the standing avatar(s) 70. In the preferred embodiment, a drag and drop menu scheme is utilized to allow material to be presented on the video walls or screens 106a, 106b, 106c. Many commercially available software applications are ideally suited for such presentation. For example, a presenting avatar(s) 70 can use a presentation software package like Powerpoint (Powerpoint is a trademark of Microsoft, Inc.) to start or advance the presentation material on a projector by using their exaggerated pointer 72. Each video wall or screen 106a, 106b, 106c preferably includes a respective projector icon 109a, 109b, 109c for use in zoom locking. Any participant can zoom lock in on any video wall or screen by selecting the designated projector icon for that particular video wall or screen. The projector icons 109a, 109b, 109c may optionally include additional functionality to assist in selecting and driving the presentations. A seated avatar 70 wishing to make a presentation can do so by selecting an empty pedestal 104 thereby transporting himself to the pedestal 104 and enabling their presentation mode. Once a standing avatar 70 is finished presenting, he can move off the pedestal by selecting an empty seat. Once the presentation is over, the avatars 70 can exit the Command Room 102 by using their exaggerated pointers to select another location in the VCP, such as the commander's bridge. A flow diagram describing how an avatar makes a presentation within the Command room 102 is illustrated in FIG. 7A.

Another global tool under the Command section 100 is the Virtual Video Phone 130. This global tool allows for one of the video walls 106a, 106b, 106c to become a two way screen to receive live and canned video and audio data streams from the real world. For example, the Virtual Video Phone 130 enables a non-immersed user sitting in front of a video phone to make a live recording of his image and voice and project his recorded video and audio stream onto a selected one of the video walls 106a, 106b, 106c of the Command Room 102. The non-immersed user, if provided with a suitable screen display, would also be able to see into and hear audio communications from the Command Room 102, albeit from a fixed perspective.

Another global tool under the Command section 100 is the Virtual VCR 140. The Virtual VCR 140 is camera function that records all the changes in audio and visual data that occur in the Command Room 102 for a particular time period. Example uses of the Virtual VCR 140 include: (1) recording the types of maps or graphical data displayed on the video walls 106a, 106b, 106c; (2) recording the avatars in attendance at the meeting; (3) recording the changes in position of the avatars in attendance; and (4) recording any audio streams that are generated during the meeting. In accordance with an advantageous feature of the present invention, the Virtual VCR 140 uses very little bandwidth since it does not record the entire image from every perspective of the virtual environment but instead records only the changes that occur in the virtual environment. The Virtual VCR 140 makes an initial recording of the preconditions in the virtual environment (e.g., it would initially record the maps that were opened, the avatars that were present, etc.) and then only records the changes to the preconditions as they occur. This technique conserves significant bandwidth and permits recording for hours at a time.

In accordance with a preferred embodiment, the Virtual VCR 140 comprises one or more cameras that are able to float about and record the command post environment from numerous angles. The Virtual VCR 140 enables the users of the VCP to switch from their normal avatar viewpoint perspective of the command post environment to a disembodied perspective representing the viewpoint of the Virtual VCR camera(s). The user's ability to change their viewing perspective from an avatar viewpoint perspective to a disembodied perspective may be done in both realtime and historical time. The historical time data recorded by the Virtual VCR 140 can be used for playback to better understand the successes or failures that were happening in the virtual command post environment for use in developing future models, doctrines, etc.

The last global tool under the Command section 100 is the Document Control 150. Document Control 150 allows command to distribute master documents with multi-level information (such as overlays). Document Control 150 identifies what documents are being used and which avatar(s) has (have) access to view them. Access to all or part of a particular document of interest can be controlled by user identification.

Control Room

Figure 8:
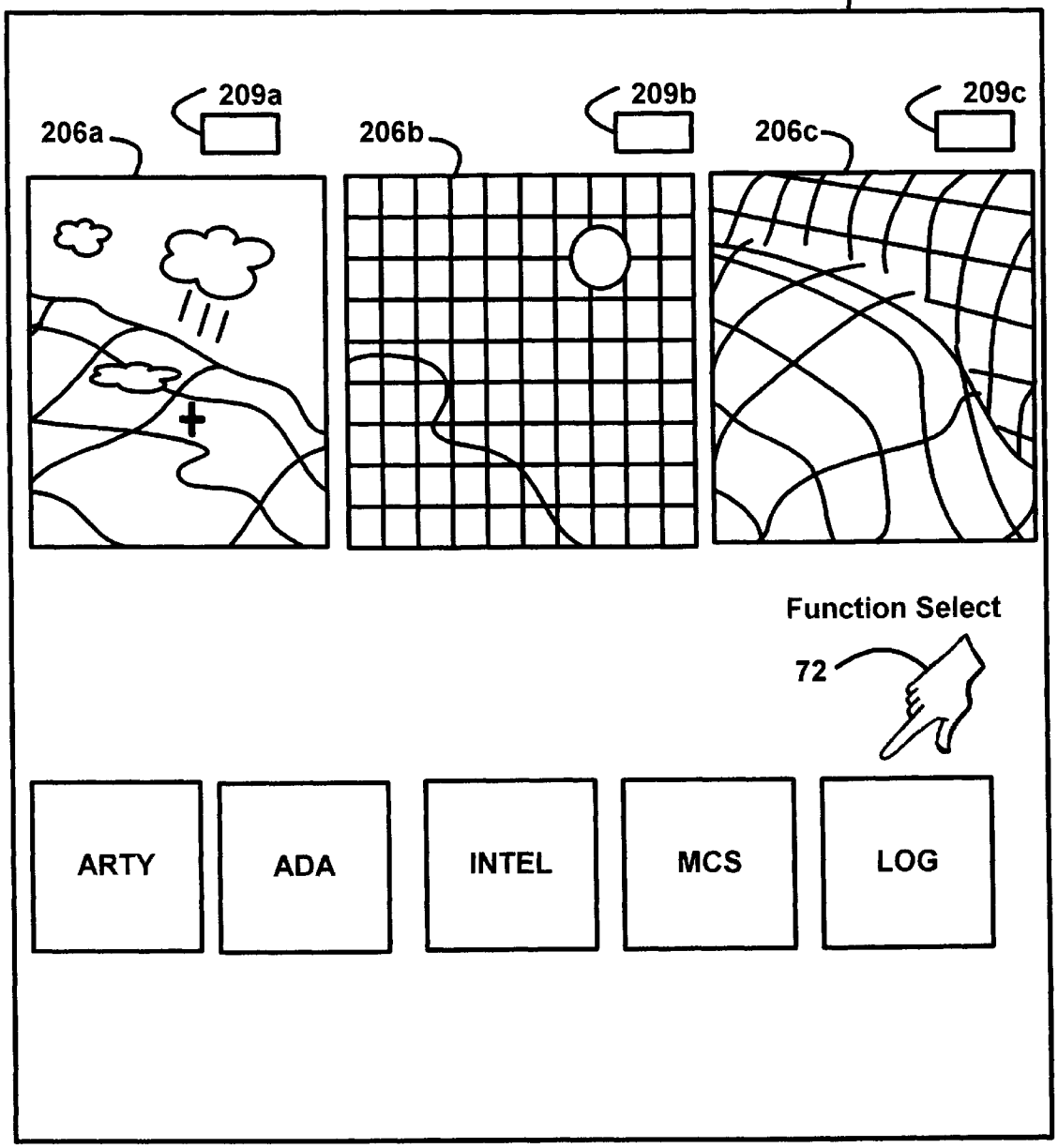
FIG. 8 illustrates a simulation of the Control Room within the VCP in accordance with the present invention.

With reference to both FIGS. 6 and 8, the Control section 200 determines how staff are utilized and configured in the VCP. This activity take place in the Control Room 202. FIG. 8 shows a depiction of the Control Room 202 in the VCP as seen from an avatar's perspective (note: the avatar's exaggerated pointer 72 is visible in FIG. 8).

The global tools specific to the Control section 200 include: Avatars and Staff Interact 210, Configure Staff 220, Virtual Video Phone 230, Virtual VCR 240, Document Control 250, Document Drive, and Commander's Remote 270. The Virtual Video Phone 230, Virtual VCR 240, and Document Control 250 in the Control section 200 perform the same functions as described above in connection with the Command section 100 and therefore a description of these global tools will not be repeated here.

Avatar and Staff Interact 210 controls the interaction between the avatars of fully immersed users (i.e., executive level users 30a), the avatars of partially immersed users (i.e., operations level users 30b) and the seated avatars of non-immersed users (i.e., staff lever users 30c) in the VCP environment. The method for providing intuitive and clear interaction between avatars (e.g. conferencing) may be preformed in accordance with known virtual conferencing techniques such as those disclosed in U.S. Pat. No. 5,491,743 issued to Shijo et al. or U.S. Pat. No. 5,347,306 issued to Nitta. An advantageous feature of the Avatar and Staff Interact 210 is that it allows interaction between the non-immersed staff level users and the immersed operations level and/or executive level users. The staff level users are typical displayed in the virtual environment as seated avatars at a computer screen or as functional icons. Interaction between non-immersed staff level users and immersed users is accomplished by passing electronic and audio information into the virtual environment. The primary function of the non-immersed staff level user is to gather raw data and forward it to the virtual environment for use and/or further processing by an operations level user who then would use the processed data to present it to the executive level user. The staff level user can be told via its audio link that the information that they have prepared is either good or bad.

Configure Staff 220 allows an operations level avatar to configure the grouping of staff level users that they want or need to fulfill a particular assignment. In certain situations, a lot of staff may be needed to perform a similar data gathering function. In other situations, only a few staff performing individual data gathering functions may be required. In general, the rooms of the VCP are populated by seated non-immersed avatars which represent the staff level users. The five functional icons shown in FIG. 8 represent five pre-configured staff level users labeled as ARTY (Artillery), ADA (Air Defense), INTEL (Intelligence), MCS (Maneuver and Control Systems), and LOG (Logistics). These functional icons represent applications for which one ore more staff level users are responsible for generating the required raw data. In accordance with the present invention, the operations and executive level avatars will work with the applications of the staff level users by using the video walls or projection screens to call up and display the work the application work in progress. So for instance, if an executive or operations level avatar is interested in viewing and/or manipulating the work in progress of one of the staff level users, he can use his exaggerated pointer 72 to click on and select the desired icon (for example the LOG icon illustrated in FIG. 8) and drag the selected icon to one of the video walls 206a, 206b, 206c, where he would then click another button to release the icon for display on the video wall (again, just like using a mouse in Windows). The displayed work can then be viewed, captured or used as part of a presentation. Information can be distilled from the display and the distilled information it can be used to issue orders to real world troops.

Configure Staff 220 also allows executive or, preferably, operations level avatars to pick and choose their staff and to create the links between them to either collaborate directly with each other or to only dump their information to them. Configure Staff 220 is implemented as a network routing function, whereby a pool of staff is available and the object is to route the communications in a particular fashion in accordance with a specified need. The five staff icons shown in FIG. 8 represent pre-configured staff functions. Each staff function has associated therewith a series of preferences which can be individually selected and combined or cross linked with selected preferences of the other pre-configured staff functions. In this way, an operations level avatar can configure his staff as needed for gathering specialized information.

Document Drive 260 allows people to send and receive information to and from the VCP. The Document Drive 260 is essentially like a fax/modem function that allows an avatar to send e-mail or faxes to other locations outside the virtual environment. In this way, information that has undergone processing inside the virtual environment can be transmitted to the real world.

Commander's Remote 270 allows an executive level user or commander to change the priority of screens or video walls 206a, 206b, 206c currently being displayed. In certain situations, multiple staff level users may be providing their data streams to the virtual environment. For practical purposes, there are only a certain number of screens available in the VCP to look at the information being fed into the VCP. The Commander's Remote 270 allows an authorized user to "channel surf" the information coming from the various sources.

For example, an operations level user may want to have a real time discussion with the staff level user as to what information they are preparing. Using the Commander's Remote 270, the operations level user could display on one of the display screens 206a, 206b, 206c the real time data being prepared by a particular staff level user by "clicking on" a seated figure depicted in the virtual environment corresponding to that particular staff level user. The operations level user could then view and interact with the displayed data and even make physically changes to this data if so desired. The operations level user may then present the processed data to the executive level user or commander. The staff level user would normally not see on his own screen display the interaction that takes place with his data in the virtual environment. He would be informed of the changes by the operations level user who may either transmit the changes back to the staff level user or simply advise him of the changes orally.

If the raw data being prepared by the staff level user is an interactive document, the staff level user and operations level user could collaborate on it. And this would be collaboration between an immersed and non-immersed participant in a virtual environment. Or you could simply just tell them.

Communications Room

Figure 9:
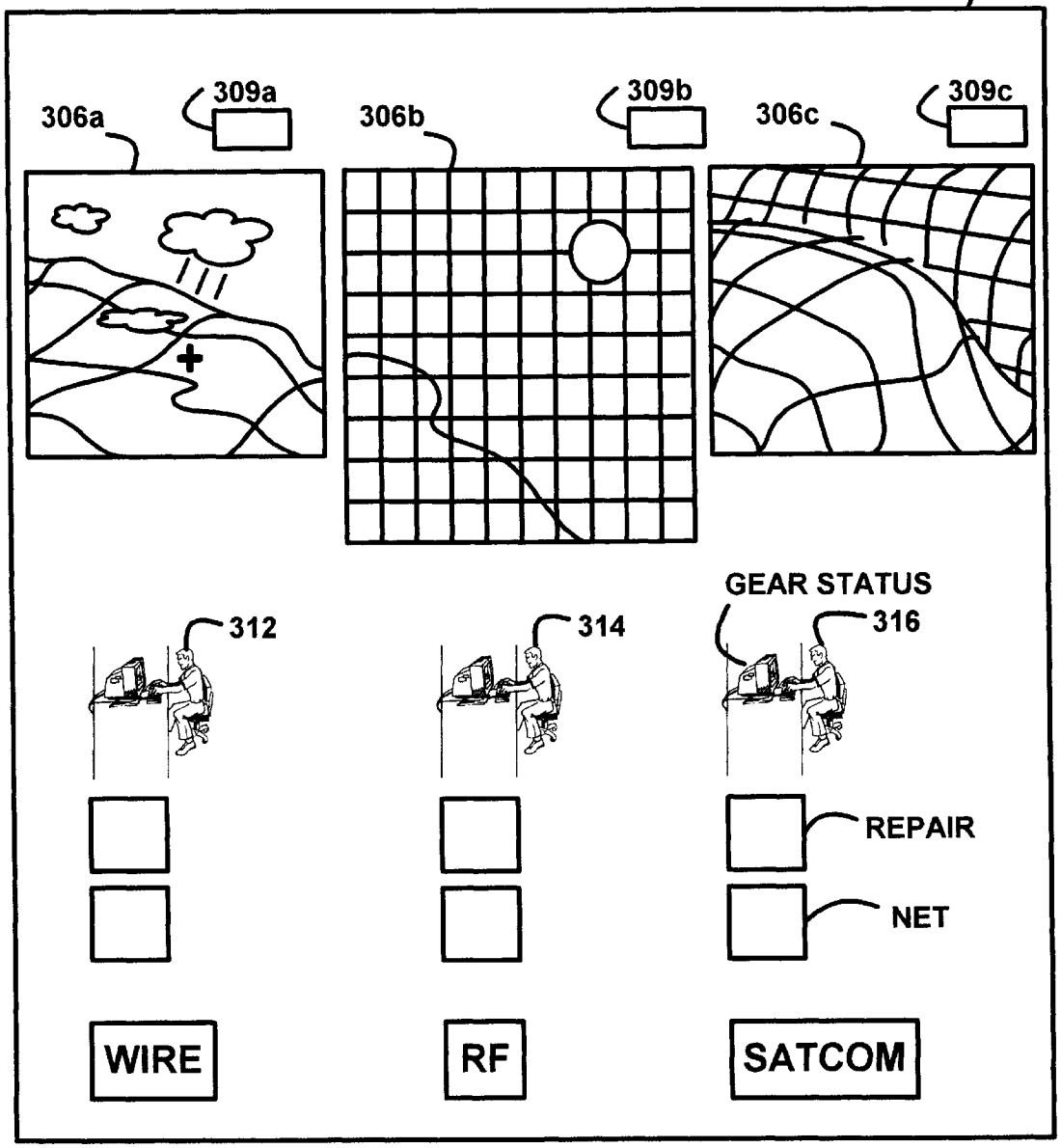
FIG. 9 illustrates a simulation of the Communications Room within the VCP in accordance with the present invention.

Referring to FIGS. 6 and 9, the Communications section 300 allows the avatars to monitor the status and performance of all the communications networks of the VCP. This activity takes place in the Communications Room 302. In military applications, it is of critical importance to be able to monitor the status of communications links and to make appropriate adjustments when the communications links deteriorate or change due to troop movements or changing conditions. The global tools specific to the Communications section 300 include: Automaton Avatar 310; Document Control 320; Commander's Remote 330; and Virtual VCR 340. The Document Control 320; Commander's Remote 330; and Virtual VCR 340 in the Communications section 300 perform the same function as described above in connection with the Command section 100 and the Control section 200 and therefore a description of these global tools will not be repeated here.

As shown in FIG. 9, the simulated Communications Room 302 contains three video walls or screens 306a, 306b, 306c and their respective projector icons 309a, 309b, 309c. The Communications Room 302 further includes automaton avatars 312, 314, and 316 which are part of the Automaton Avatar function 310 of the global tools (FIG. 6). The automaton avatars 312, 314, and 316 are functional icons (displayed as seated avatars) that correspond to staff level users connected to the network. Each of the functional icons can be selected by the executive and operations level avatars to provide a human like interface to provide an audio or voice status update of a particular communications network that the staff level user controls. In accordance with a preferred embodiment of the invention, the types of communications networks displayed in the Communications Room 302 include a ground based wire or fiber optic communications network (automaton avatar 312), a radio frequency (RF) communications network (automaton avatar 314), and a satellite communications network (automaton avatar 316).

When an executive or operations level avatar selects one of the automaton avatars 312, 314 or 316, a drop down menu containing three option buttons (labeled as GEAR STATUS, REPAIR and NET) is displayed. The executive or operations level avatar may then project the information corresponding to one of the button options on a video wall or screen by clicking on the desired button option, dragging it to a video wall or screen 306a, 306b, or 306c and releasing it onto the screen. So, for example, if an executive or operations level avatar were interested in the current status of the satellite communications network, he would first select automaton avatar 316 and then drag and click the NET button onto one of the video walls 306a, 306b, or 306c. The result would be a visual display of the current SATCOM network for the VCP. If the avatar then clicked on the REPAIR button, it will run a screen that will enable the avatar to conduct a repair of the network as much as possible using the computer and software technology of the VCP.

Cognition Room

Referring to FIGS. 6 and 10–14, the Cognition section 400 allows the avatars to analyze terrain and troop movement. This activity takes place in the Cognition Room 402 of the VCP. The global tools specific to the Cognition section 400 include: Sand Table 410; Animated Overlays 420; Document Control 430; Document Drive; and Virtual VCR 440. The Document Control 430; Document Drive; and Virtual VCR 440 in the Cognition section 400 perform the same functions as described above in connection with the Command section 100, Control section 200, and Communications section 300 and therefore a description of these global tools will not be repeated here.

Figure 10:
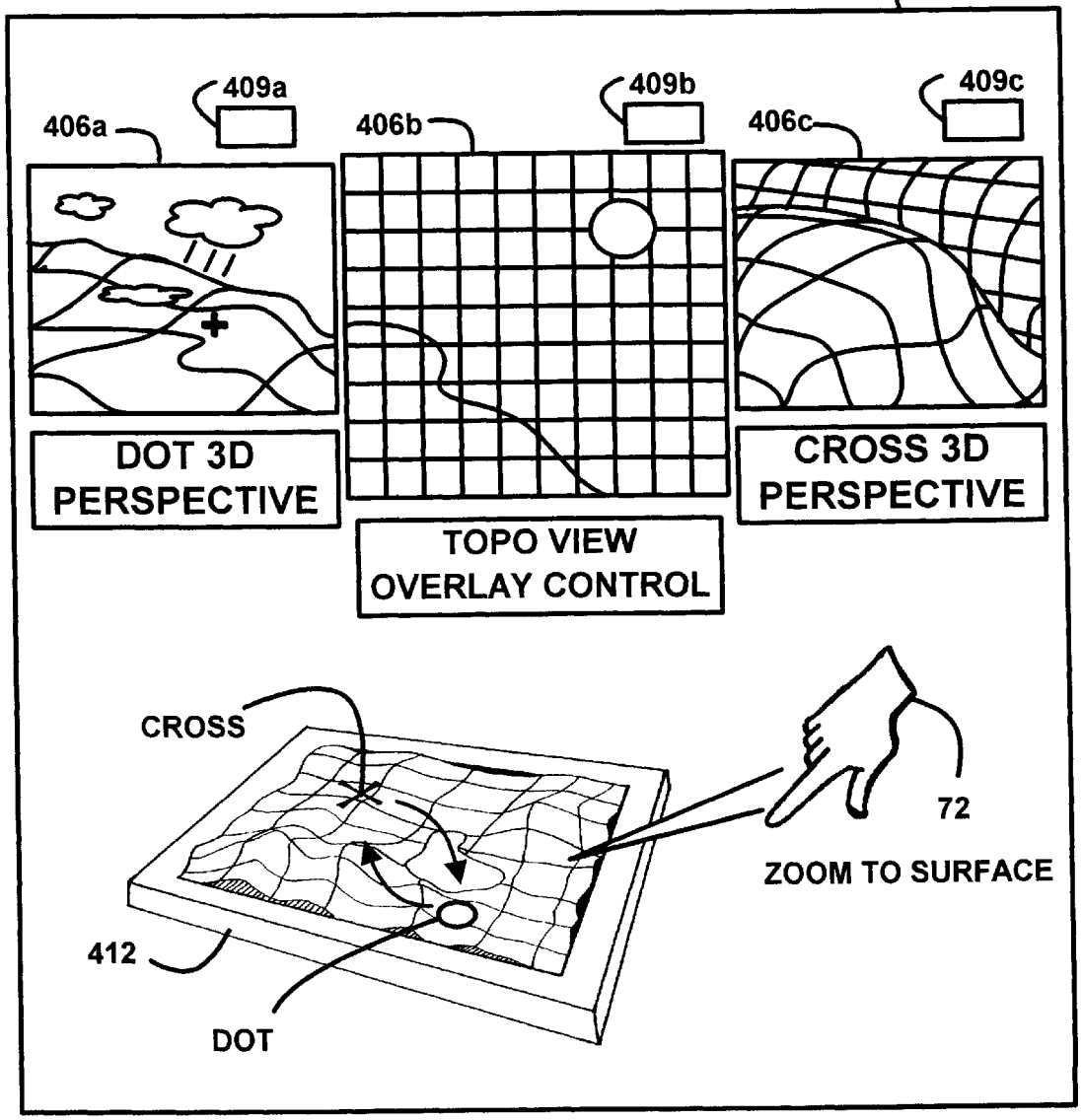
FIG. 10 illustrates a simulation of the Cognition Room within the VCP in accordance with the present invention.

As shown in FIG. 10, the virtual Cognition Room 302 contains three video walls or screens 406a, 406b, 406c and their respective projector icons 409a, 409b, 409c. The Cognition Room 402 further includes a virtual sand table 412 which forms a part of the Sand Table function 410 of the Cognition section 400 (FIG. 6). Sand tables have existed in military planning for centuries. Sand tables are one of the most powerful tools for use in analyzing terrain and troop movement. Typically, the sand table 412 is used to represent a scale model of the battlefield. The sand table 412 in the VCP incorporates several novel features that dramatically increase the commander and staffs situational awareness and productivity in planning, rehearsal, and tactical situations.

In accordance with the Sand Table function 410 (FIG. 6), map data is displayed simultaneously in two and three dimensional formats. Furthermore, in accordance with the Animated Overlay function 420, the two dimensional and three dimensional data are linked as overlays. Overlays are analogous to transparent layers printed with scaled and registered information as currently used by the Army. The sand table overlays, however, can be placed over and contoured deformed to the surface of the three dimensional sand table 412. Additionally, the overlays display time synchronized animated data. This allows the battle to be played in a gestalt-like manner or dissected to individual components.

As seen in FIG. 10, the sand table 412 provides a three dimensional format of the battlefield. The sand table 412 preferably includes a dot and a cross as reference indicators. The three video walls or screens 406a, 406b, 406c may be used to project different two dimensional overlays or views of the sand table. For example, the projection on video wall 406a is a two dimensional view of the cross as seen from the dot perspective. The projection on the center video wall 406b is a topographical view of the sand table 412. The projection on video wall 406c is a dimensional view of the dot as viewed from the cross perspective.

As the commander or staff modify the two dimensional overlays displayed on screens 406a, 406b, 406c, the result is dynamically played on the three dimensional sand table 412. Displayed elements can be directly manipulated by the avatars resulting in real time data updates. These updates can result in the direct issuance of orders to be carried out in the virtual and real worlds.

Figure 11:
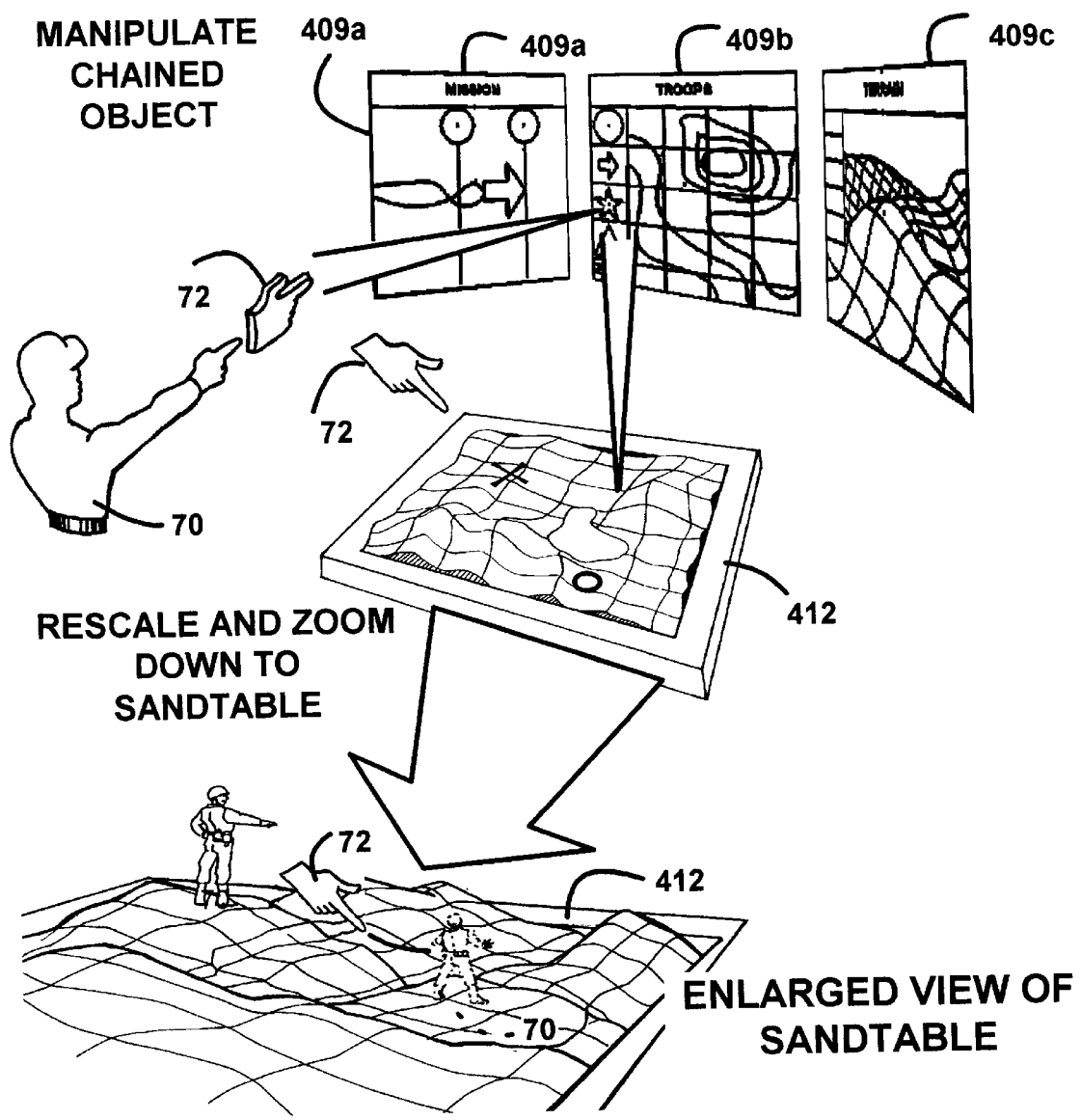
FIG. 11 is an illustration of the Sand Table function associated with the Cognition Room of the VCP.
Figure 12:
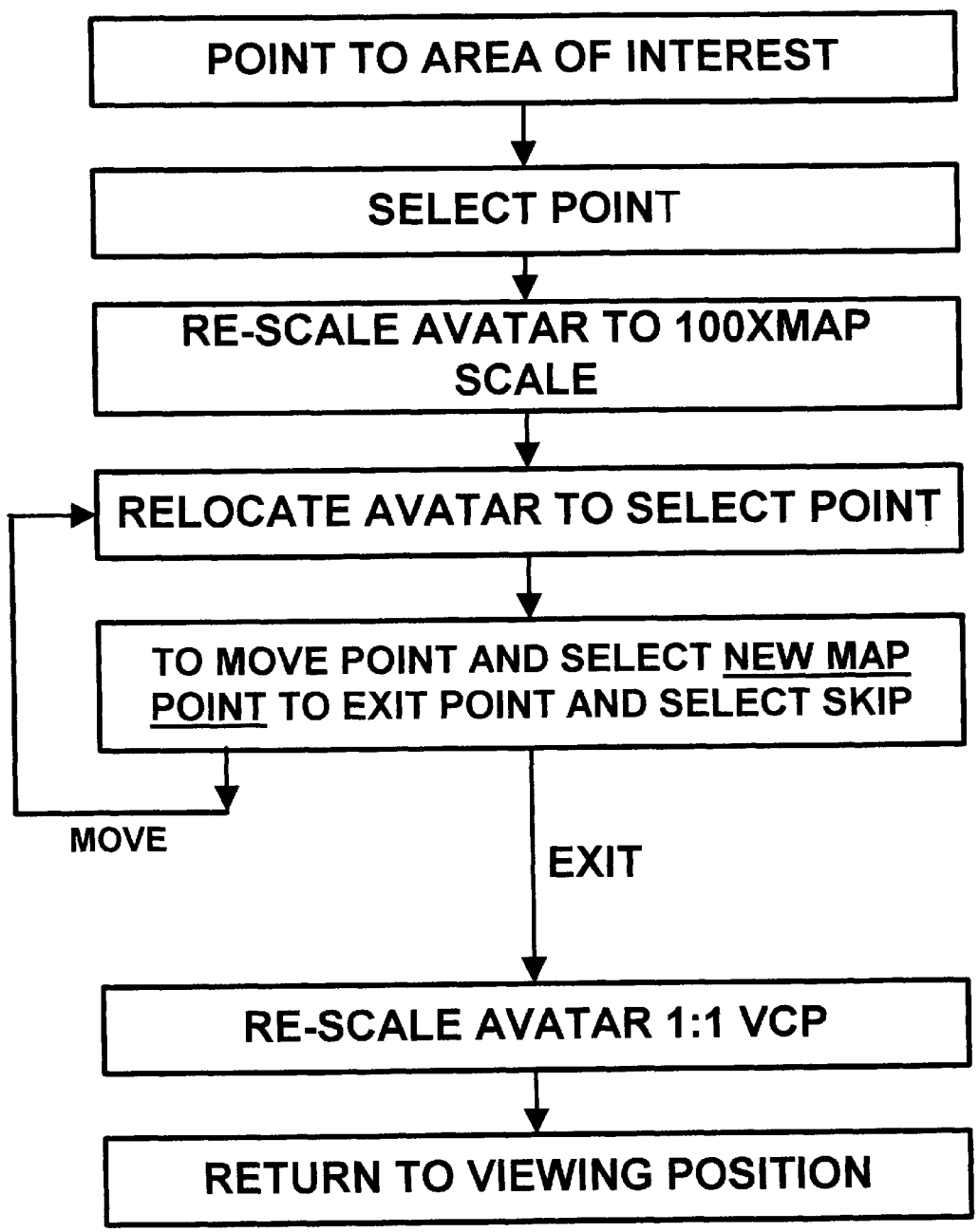
FIG. 12 is a flow diagram of the Sand Table function.

A detailed description of the Sand Table function 410 is best understood with reference to FIG. 11 and the flow diagram of FIG. 12. An advantages feature of the Sand Table function 410 is that it enables an avatar 70 to use an exaggerated pointer 72 to pick a point on the surface of the three dimensional sand table 412. The result is that the avatar 70 is re-scaled to the scale of the sand table and is now able to view the terrain of the sand table from the re-scaled perspective. This allows the command and staff level users to view terrain at scales of 1:1. The exaggerated pointer 72 can be used to move the avatar 70 from one location to another on the sand table 412. To return to normal scale, the avatar 70 simply points the exaggerated pointer off the sand table 412 and actuates the switchable button 48.

Figure 13:
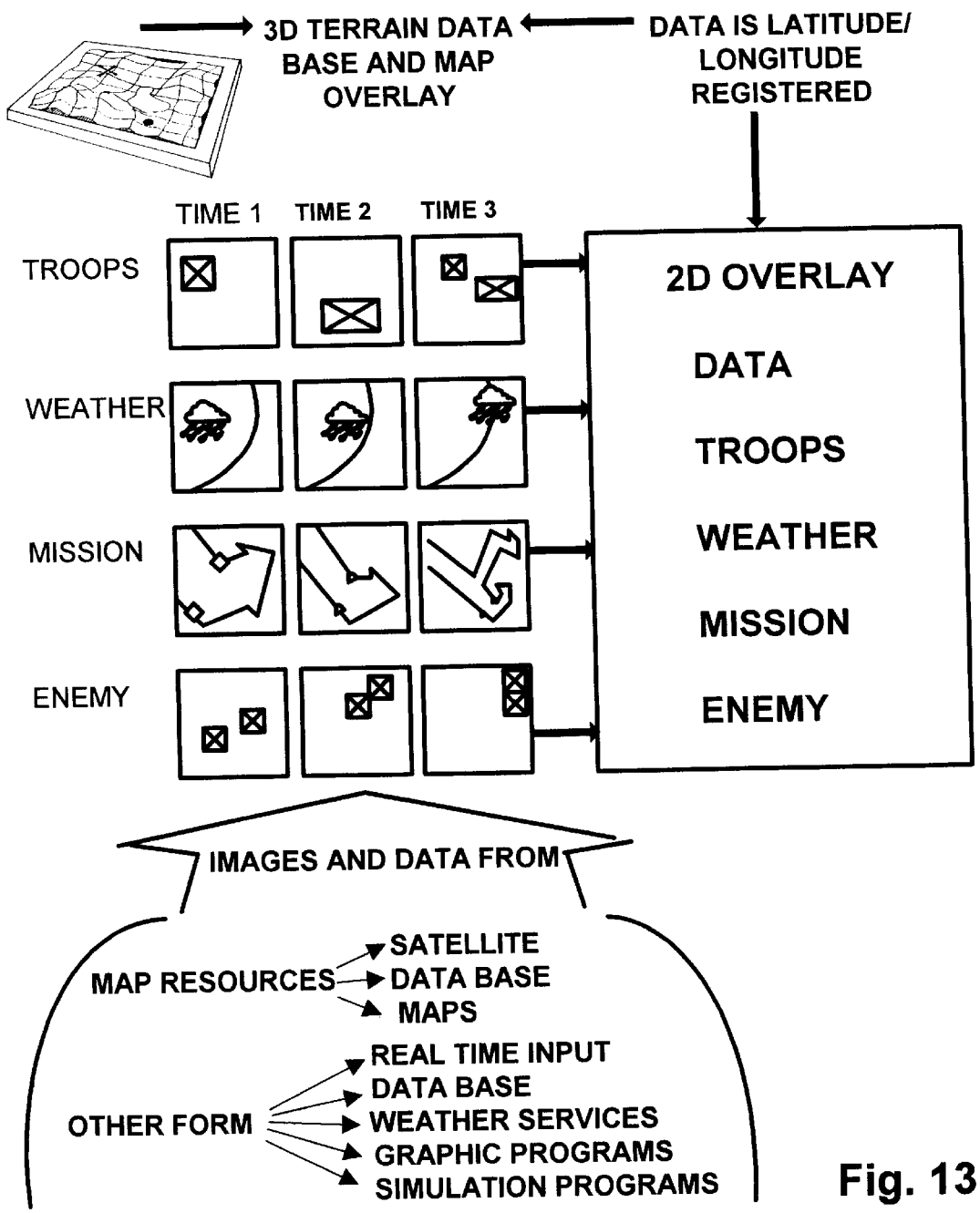
FIG. 13 illustrates the Animated Overlay function associated with the Cognition Room of the VCP.
Figure 14:
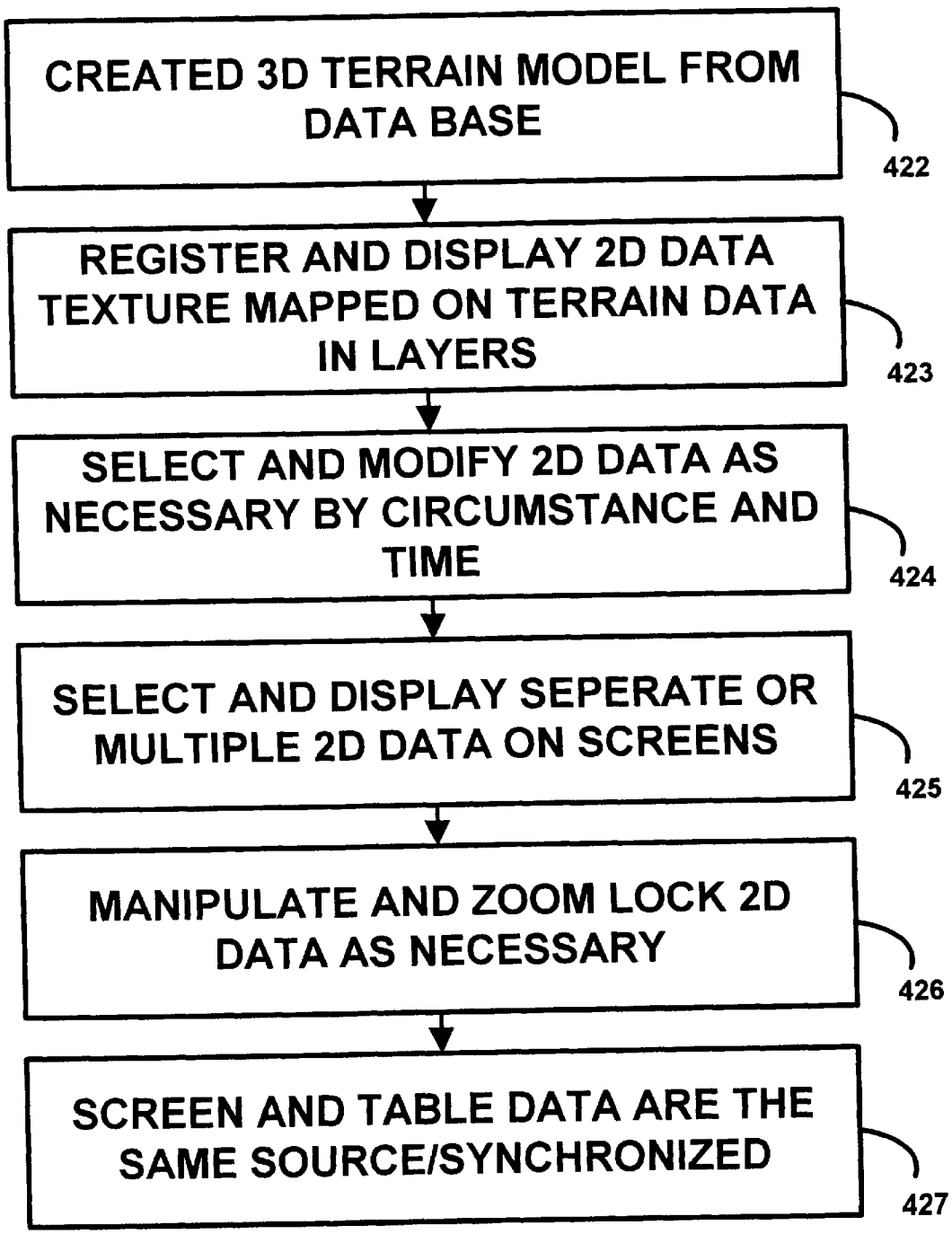
FIG. 14 is a flow diagram of the Animated Overlay function.

A detailed description of the Animated Overlays function 420 is best understood with reference to FIG. 13 and the flow diagram of FIG. 14. In accordance with a preferred embodiment of the invention, the Animated Overlays function 420 incorporates currently available mapping, such as the Mapping, Charting and Geodesy Utility Software Environment (MUSE) prepared by Defense Mapping Agency Systems Center of St. Louis, Mo. The MUSE software is designed to to provide standard routines to interact with digital data and demonstration mapping software provided by the Defense Mapping Agency (DMA). Map data generated by such available mapping, charting and geodesy software is used to drive the sand table and overlays. The current software generates two dimensional map views based on the generated data. The data is latitude and longitude registered.

The Animated Overlays function 420 also collects data from other map sources outside the VCP and this data is used to redraw new maps that change over time. The information used to drive the display of the sand table 412 and animated overlays may include, for example, map sources such as satellites, data bases, and existing maps as well as real time input sources such as Global Positioning Sensor (GPS) information from specially equipped friendly tanks, existing data bases, weather services, and graphic programs such as paint programs.

FIG. 14 illustrates a flow chart of the Animated Overlays function 420 for driving the multi-layer two dimensional/three dimensional sand table 412. At 422, map data from a database and/or from satellite feeds is used to generate a three dimensional terrain model of the sand table. At 423, two dimensional map data (e.g. as received from weather services and other government agencies and resources) is registered to the three dimensional coordinate system for the sand table and is texture mapped onto the terrain data in layers. Avatars can select and modify the two dimensional data as necessary by circumstance or time (step 424) or select and display separate or multiple two dimensional data on the projection screens 406a, 406b, 406c (step 425) or manipulate and zoom lock two dimensional data as necessary (step 426). The result of any of these steps is that the two dimensional screen data is synchronized to the three dimensional data displayed on the sand table 412. So, for instance, if an avatar viewing the one of the two dimensional screens wishes to reposition a tank on the map, he can move it (using his exaggerated pointer) which, in turn, moves the tank on the three dimensional sand table 412.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A system comprising a plurality of networked terminal apparatus for creating a three dimensional virtual work environment wherein terminal users of various levels of immersion are depicted as avatars in the virtual work environment and wherein action information of the terminal users is input into the virtual work environment through their corresponding avatars in order to perform complimentary, independent and cooperative tasks in parallel to create simultaneous sets of solutions to problems relating to command, control, communications, cognition and intelligence, the system comprising:

a) at least one first level terminal apparatus for a first fully immersed terminal user, said first level terminal apparatus including:

i) first display means for displaying said virtual work environment and for displaying, in the virtual work environment, avatars corresponding to all terminal users of the virtual work environment and for displaying functional objects in the virtual work environment;

ii) first database for prestoring computer model information and graphics for the layout of the virtual environment and the appearance of each terminal user's avatar in the virtual environment as well as collateral information including maps, documents and presentation materials;

iii) first program means for supporting interaction between avatars and said functional objects;

iv) first position tracking means for correlating head and hand movements of said first fully immersed terminal user to their corresponding avatar displayed in the virtual work environment;

v) first audio input/output means for communicating voice data back and forth between the first fully immersed terminal user and the virtual work environment;

vi) first control means for controlling said first display means, said first database and program means, said first position tracking means, and said first audio input/output means;

b) at least one second level terminal apparatus for a second partially immersed terminal user, said second level terminal apparatus including:

i) second display means for displaying said virtual work environment and for displaying, in the virtual work environment, avatars corresponding to all terminal users of the virtual work environment and for displaying functional objects in the virtual work environment;

ii) second database for prestoring computer model information and graphics for the layout of the virtual environment and the appearance of each terminal user's avatar in the virtual environment as well as collateral information including maps, documents and presentation materials;

iii) second program means for supporting interaction between avatars and said functional objects;

iv) second position tracking means for correlating head and hand movements of said second partially immersed terminal user to their corresponding avatar displayed in the virtual work environment;

v) second audio input/output means for communicating voice data back and forth between the second partially immersed terminal user and the virtual work environment;

vi) second electronic data entry means for entering electronic data into the virtual work environment;

vi) second control means for controlling said second display means, said second database and program means, said second position tracking means, said second audio input/output means, and said second electronic data entry means; and c) wherein at least one of said first or second level apparatus further includes object selection means comprising an exaggerated pointer displayed in said virtual work environment, and wherein said object selection means is operative to point to, select and manipulate functional objects displayed in said virtual work environment and is operative to point to and select one or more designated transportation sites displayed in said virtual work environment, whereby selection of a designated transportation site transports the selecting avatar to said designated transportation site and provides an appropriate change in the view perspective of the selecting avatar.

2. The system according to claim 1, which further comprises a third level terminal apparatus for a non-immersed terminal user, said third level terminal apparatus including:

a) third data entry means for entering electronic data generated by said non-immersed terminal user into said virtual work environment;

b) third audio input/out means for communicating voice data back and forth between said third non-immersed terminal user and said virtual work environment;

c) third display means for displaying said electronic data generated by said non-immersed terminal user;

d) third database and program means for providing a local database of programs and information for supporting the electronic information entry capability of said non-immersed user; and e) third control means for controlling said third electronic data entry means, said third audio input/out means, said third display means, and said third database and program means.

3. The system according to claim 2, wherein:

a) said virtual environment includes at least one projection screen for displaying data and information of interest including bit mapped images, pictures, slide shows, movies and text; and wherein b) at least one of said first, second or third terminal apparatus further includes means for projecting, in real time, the electronic data generated by said non-immersed user onto said at least one projection screen for viewing by all avatars present in said virtual work environment.

4. The system according to claim 3, wherein each of said first and second level terminal apparatus include zoom lock means for zooming in on an image being projected on a projection screen in the three dimensional virtual work environment and locking said image as a full frame two dimensional image on the respective first or second display means of the respective first or second level user.

5. The system according to claim 3, wherein each of said first and second level terminal apparatus further include means for receiving and carrying on a private communication originating from outside the virtual environment.

6. The system according to claim 3, which further includes means for transforming a projection screen displayed in said virtual environment into a video phone for receiving real time video and audio data streams originating from a non-immersed user outside the virtual environment.

7. The system according to claim 3, which further include recorder means for recording audio and visual changes that occur in said virtual environment for a desired duration, said recording means further including means for recording initial preconditions of video data in said virtual environment, thereby to preclude the necessity of recording full frame bandwidth intensive video data during said desired duration.

8. The system according to claim 7, wherein recorder means permit avatars to select a disembodied viewpoint perspective of said virtual work environment in both real-time and historical time.

9. The system according to claim 3, wherein at least one of said first or second level terminal apparatus further includes means for configuring and networking groupings of users of said third level terminal apparatus so that data generated by said third level users can be combined and formatted in a desired manner.

10. The system according to claim 3, which further includes document drive means for sending and receiving information to and from non-immersed users outside of said virtual environment.

11. The system according to claim 3, wherein at least one of said first or second level terminal apparatus further includes remote control means for switching priority of display on said at least one projection screen in said virtual environment the electronic data generated by a plurality of third level terminal apparatus users.

12. The system according to claim 3, which further includes:
   a) means for terrain mapping two dimensional map images onto a three dimensional model in the virtual environment; and
   b) means for interactively linking two dimensional map images with said terrain mapped images of said three dimensional such that manipulation of one of said two dimensional map images or said three dimensional model causes changes in the other said two dimensional map images or said three dimensional model.

13. The system according to claim 12, wherein each of said first and second level terminal apparatus include rescaling means for rescaling their respective avatars down to the scale of said three dimensional model.

14. The system according to claim 3, wherein each of first and second level terminal apparatus include staff configuration means for configuring an appropriate amount of third level apparatus users, intelligent agents, programs, databases, and related resources that are required to perform a specific task or objective.

15. A system comprising a plurality of networked terminal apparatus for creating a three dimensional virtual work environment wherein terminal users of various levels of immersion are depicted as avatars in the virtual work environment and wherein action information of the terminal users is input into the virtual work environment through their corresponding avatars in order to perform complimentary, independent and cooperative tasks in parallel to create simultaneous sets of solutions to problems relating to command, control, communications, cognition and intelligence, the system comprising:
   a) at least one first level terminal apparatus for a first fully immersed terminal user, said first level terminal apparatus including:
      i) first display means for displaying said virtual work environment and for displaying, in the virtual work environment, avatars corresponding to all terminal users of the virtual work environment and for displaying functional objects in the virtual work environment;
      ii) first database for prestoring computer model information and graphics for the layout of the virtual environment and the appearance of each terminal user's avatar in the virtual environment as well as collateral information including maps, documents and presentation materials;
      iii) first program means for supporting interaction between avatars and said functional objects;
      iv) first position tracking means for correlating head and hand movements of said first fully immersed terminal user to their corresponding avatar displayed in the virtual work environment;
      v) first audio input/output means for communicating voice data back and forth between the first fully immersed terminal user and the virtual work environment;
      vi) first control means for controlling said first display means, said first database and program means, said first position tracking means, and said first audio input/output means;
   b) at least one second level terminal apparatus for a second partially immersed terminal user, said second level terminal apparatus including:
      i) second display means for displaying said virtual work environment and for displaying, in the virtual work environment, avatars corresponding to all terminal users of the virtual work environment and for displaying functional objects in the virtual work environment;
      ii) second database for prestoring computer model information and graphics for the layout of the virtual environment and the appearance of each terminal user's avatar in the virtual environment as well as collateral information including maps, documents and presentation materials;
      iii) second program means for supporting interaction between avatars and said functional objects;
      iv) second position tracking means for correlating head and hand movements of said second partially immersed terminal user to their corresponding avatar displayed in the virtual work environment;
      v) second audio input/output means for communicating voice data back and forth between the second partially immersed terminal user and the virtual work environment;
      vi) second electronic data entry means for entering electronic data into the virtual work environment;
      vi) second control means for controlling said second display means, said second database and program means, said second position tracking means, said second audio input/output means, and said second electronic data entry means;
   c) avatar selectable, non-human, intelligent agents displayed as seated avatars in said virtual work environment; and
   d) wherein at least one of said first or second level apparatus further includes object selection means comprising an exaggerated pointer displayed in said virtual work environment, and wherein said object selection means is operative to point to, select and manipulate functional objects displayed in said virtual work environment.

16. The system according to claim 15, which further comprises a third level terminal apparatus for a non-immersed terminal user, said third level terminal apparatus including:
   a) third data entry means for entering electronic data generated by said non-immersed terminal user into said virtual work environment;
   b) third audio input/out means for communicating voice data back and forth between said third non-immersed terminal user and said virtual work environment;
   c) third display means for displaying said electronic data generated by said non-immersed terminal user;
   d) third database and program means for providing a local database of programs and information for supporting the electronic information entry capability of said non-immersed user; and
   e) third control means for controlling said third electronic data entry means, said third audio input/out means, said third display means, and said third database and program means.

17. The system according to claim 16, wherein:
   a) said virtual environment includes at least one projection screen for displaying data and information of interest including bit mapped images, pictures, slide shows, movies and text; and wherein
   b) at least one of said first, second or third terminal apparatus further includes means for projecting, in real time, the electronic data generated by said non-immersed user onto said at least one projection screen for viewing by all avatars present in said virtual work environment.

18. The system according to claim 17, wherein each of said first and second level terminal apparatus include zoom lock means for zooming in on an image being projected on a projection screen in the three dimensional virtual work environment and locking said image as a full frame two dimensional image on the respective first or second display means of the respective first or second level user.

19. The system according to claim 17, wherein each of said first and second level terminal apparatus further include means for receiving and carrying on a private communication originating from outside the virtual environment.

20. The system according to claim 17, which further includes means for transforming a projection screen displayed in said virtual environment into a video phone for receiving real time video and audio data streams originating from a non-immersed user outside the virtual environment.

21. The system according to claim 17, which further include recorder means for recording audio and visual changes that occur in said virtual environment for a desired duration, said recording means further including means for recording initial preconditions of video data in said virtual environment, thereby to preclude the necessity of recording full frame bandwidth intensive video data during said desired duration.

22. The system according to claim 21, wherein recorder means permit avatars to select a disembodied viewpoint perspective of said virtual work environment in both real-time and historical time.

23. The system according to claim 17, wherein at least one of said first or second level terminal apparatus further includes means for configuring and networking groupings of users of said third level terminal apparatus so that data generated by said third level users can be combined and formatted in a desired manner.

24. The system according to claim 17, which further includes document drive means for sending and receiving information to and from non-immersed users outside of said virtual environment.

25. The system according to claim 17, wherein at least one of said first or second level terminal apparatus further includes remote control means for switching priority of display on said at least one projection screen in said virtual environment the electronic data generated by a plurality of third level terminal apparatus users.

26. The system according to claim 17, which further includes:
   a) means for terrain mapping two dimensional map images onto a three dimensional model in the virtual environment; and
   b) means for interactively linking two dimensional map images with said terrain mapped images of said three dimensional such that manipulation of one of said two dimensional map images or said three dimensional model causes changes in the other said two dimensional map images or said three dimensional model.

27. The system according to claim 26, wherein each of said first and second level terminal apparatus include rescaling means for rescaling their respective avatars down to the scale of said three dimensional model.

28. The system according to claim 17, wherein each of said first and second level terminal apparatus include staff configuration means for configuring an appropriate amount of third level apparatus users, intelligent agents, programs, databases, and related resources that are required to perform a specific task or objective.

29. The system according to claim 15, wherein said object selection means is further operative to point to and select one or more designated transportation sites displayed in said virtual work environment, whereby selection of a designated transportation site transports the selecting avatar to said designated transportation site and provides an appropriate change in the view perspective of the selecting avatar.

* * * * *